US012149993B2

(12) United States Patent
Xu et al.

(10) Patent No.: US 12,149,993 B2
(45) Date of Patent: Nov. 19, 2024

(54) METHOD TO PROVIDE HANOVER PROCESSING

(71) Applicant: DATANG MOBILE COMMUNICATIONS EQUIPMENT CO., LTD., Beijing (CN)

(72) Inventors: Meng Xu, Beijing (CN); Jing Liang, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 434 days.

(21) Appl. No.: 17/435,015

(22) PCT Filed: Feb. 28, 2020

(86) PCT No.: PCT/CN2020/077252
§ 371 (c)(1),
(2) Date: Aug. 30, 2021

(87) PCT Pub. No.: WO2020/177633
PCT Pub. Date: Sep. 10, 2020

(65) Prior Publication Data
US 2022/0141733 A1    May 5, 2022

(30) Foreign Application Priority Data
Mar. 1, 2019 (CN) .......................... 201910157382.1

(51) Int. Cl.
*H04W 36/00* (2009.01)
*H04W 36/08* (2009.01)
(Continued)

(52) U.S. Cl.
CPC ... *H04W 36/0077* (2013.01); *H04W 36/0058* (2018.08); *H04W 36/0072* (2013.01);
(Continued)

(58) Field of Classification Search
CPC ....... H04W 36/0077; H04W 36/00837; H04W 36/0058; H04W 36/0072; H04W 36/08;
(Continued)

(56) References Cited

U.S. PATENT DOCUMENTS

| 2012/0157077 A1* | 6/2012 | Lee ...................... H04W 48/04 455/434 |
| 2012/0213161 A1* | 8/2012 | Maeda .................. H04W 48/02 370/328 |

(Continued)

FOREIGN PATENT DOCUMENTS

| CN | 101494884 A | 7/2009 |
| CN | 101500282 A | 8/2009 |

(Continued)

OTHER PUBLICATIONS

"Conditional handover procedure in LTE", France, Feb. 15, 2019 (Year: 2019).*
Extended European Search Report for European Patent Application 20765736.2 issued on Mar. 17, 2022.
"Overview on mobility robustness enhancements in LTE," 3GPP TSG-RAN WG2#103bis, Tdoc, R2-1814317, Chengdu, China, Oct. 8-12, 2018, Agenda Item: 12.3.3 Handover robustness improvements, Source: Ericsson.
(Continued)

*Primary Examiner* — Mewale A Ambaye
(74) *Attorney, Agent, or Firm* — Ladas & Parry, LLP

(57) ABSTRACT

The present disclosure provides a cell handover processing method and device and an apparatus. The method includes: obtaining configuration information of a target handover cell and at least one of the following information: valid time of cell configuration information or a quantity of valid access times; performing cell handover according to the configuration information of the target handover cell within the valid time of cell configuration information and/or the quantity of valid access times.

18 Claims, 4 Drawing Sheets

(51) Int. Cl.
  *H04W 36/24* (2009.01)
  *H04W 36/36* (2009.01)
(52) U.S. Cl.
  CPC ..... *H04W 36/00837* (2018.08); *H04W 36/08* (2013.01); *H04W 36/249* (2023.05); *H04W 36/362* (2023.05)
(58) Field of Classification Search
  CPC ............. H04W 36/24; H04W 36/0085; H04W 56/0045; H04W 36/00; H04W 36/36
  See application file for complete search history.

(56) References Cited

U.S. PATENT DOCUMENTS

| | | | |
|---|---|---|---|
| 2015/0230146 | A1 | 8/2015 | Miao et al. |
| 2020/0107369 | A1* | 4/2020 | Jeon ................... H04W 74/006 |
| 2020/0275340 | A1* | 8/2020 | Kim ............... H04W 36/00835 |
| 2021/0250823 | A1* | 8/2021 | Fujishiro ............... H04W 36/36 |
| 2022/0110028 | A1* | 4/2022 | You ................... H04W 36/0058 |

FOREIGN PATENT DOCUMENTS

| | | | | |
|---|---|---|---|---|
| CN | 101686512 | A | 3/2010 | |
| CN | 103686836 | A | 3/2014 | |
| CN | 109392031 | A | 2/2019 | |
| EP | 3836623 | A1 * | 6/2021 | ........ H04W 36/0011 |
| WO | 2018230997 | A1 | 12/2018 | |
| WO | 2019154480 | A1 | 8/2019 | |

OTHER PUBLICATIONS

"Conditional handover procedure in LTE," 3GPP TSG-RAN WG2 #105, R2-1901003, Athens, Greece, Feb. 25-Mar. 1, 2019, Agenda Item:12.3.3 Handover robustness improvements, Source: NEC.

MediaTek Inc., "Conditional Handover Procedures", R2-1816959, 3GPP TSG-RAN WG2 Meeting #104, Spokane, WA, USA, Nov. 12-16, 2018, all pages.

First Office Action and search report from CN app. no. 201910157382.1, dated Jan. 15, 2021, with English translation provided by Global Dossier, all pages.

International Search Report from PCT/CN2020/077252, dated Apr. 24, 2020, with English translation from WIPO, all pages.

Written Opinion of the International Searching Authority PCT/CN2020/077252, dated Apr. 24, 2020, with English translation from WIPO, all pages.

International Preliminary Report on Patentability PCT/CN2020/077252, dated Aug. 25, 2021, with English translation from WIPO, all pages.

Office action from corresponding European Patent Application No. 20765736.2 dated Jan. 23, 2024.

Anonymous: "3rd Generation Partnership Project; Technical Specification Group Radio Access Network; NR; NR and NG-RAN Overall Description; Stage 2 (Release 15)", 3GPP TS 38.300, V15.4.0 (Dec. 2018).

* cited by examiner

METHOD TO PROVIDE HANOVER PROCESSING

CROSS-REFERENCE TO RELATED APPLICATION

The present application is the U.S. national phase of PCT Application No. PCT/CN2020/077252 filed on Feb. 28, 2020, which claims a priority of the Chinese patent application No. 201910157382.1 filed on Mar. 1, 2019, which is incorporated herein by reference in its entirety.

TECHNICAL FIELD

The present disclosure relates to the field of communications technology, in particular to a cell handover processing method and device, and an apparatus.

BACKGROUND

The 5G New Air Interface (NR) standard Rel-16 version technology introduces the concept of conditional handover, which is a method of providing one or more pre-configured target handover cells for a user equipment (UE) to improve the reliability of handover. When the handover process in the related art fails, the UE will trigger a re-establishment process to restore the radio resource control (RRC) connection. After configuring a plurality of pre-configured handover cells required for conditional handover, when a certain pre-configured cell meets the handover conditions, the UE will perform cell handover to the target pre-configured cell. If the UE fails to switch to the target handover cell, considering that there are still other pre-configured cells that retain the context and configuration information of the UE, at this time, if the UE directly enters the idle state or triggers the re-establishment process of other cells, a large data interruption delay will be introduced.

SUMMARY

An object of the present disclosure is to provide a cell handover processing method and device, and an apparatus, so as to solve the problem in the related art that after the UE fails to trigger a handover, UE directly enters the idle state or triggers the re-establishment process of other cells, a large data interruption delay will be introduced.

An embodiment of the present disclosure provides a cell handover processing method which is applied to a terminal and includes: obtaining configuration information of a target handover cell and at least one of the following information: valid time of cell configuration information or a quantity of valid access times; within the valid time of cell configuration information and/or the quantity of valid access times, performing cell handover according to the configuration information of the target handover cell.

In some embodiment, the valid time of cell configuration information is a valid duration configured for a target cell set configured by a network device for the terminal, all target handover cells configured by the network device for the terminal constitute the target cell set; or all target handover cells configured by the network device for the terminal through signaling that carries the valid time of cell configuration information constitute the target cell set; or each target handover cell or each group of target handover cells configured by the network device for the terminal respectively constitutes one target cell set; or each target handover cell or each group of target handover cells configured by the network device for the terminal through the signaling carrying the valid time of cell configuration information respectively constitutes one target cell set.

In some embodiment, the quantity of valid access times is a maximum quantity of valid access times configured for a target cell set configured by the network device for the terminal; all target handover cells configured by the network device for the terminal constitute the target cell set; or all target handover cells configured by the network device for the terminal through signaling carrying the quantity of valid access times constitute the target cell set; or each target handover cell or each group of target handover cells configured by the network device for the terminal respectively constitutes one target cell set; or each target handover cell or each group of target handover cells configured by the network device for the terminal through the signaling carrying the quantity of valid access times respectively constitutes one target cell set.

In some embodiment, within the valid time of cell configuration information and/or the quantity of valid access times, performing cell handover according to the configuration information of the target handover cell includes: within the valid time of cell configuration information and/or the quantity of valid access times, sending an access request message to the target handover cell selected by the terminal, wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

In some embodiment, the method further includes: starting a valid timer of cell configuration information and/or a counter of valid access times for the target cell set at a preset start time; wherein the preset start time includes at least one of the following: a moment when the terminal receives signaling including the valid time of cell configuration information; a moment when the terminal receives signaling including the quantity of valid access times; a moment when the terminal receives signaling including the configuration information of the target handover cell; or a moment when the terminal initiates an access request in the target cell set for a first time, wherein a duration of the valid timer of cell configuration information is the valid time of cell configuration information, and a maximum quantity of the counter of the valid access times is the quantity of valid access times.

In some embodiment, within the valid time of cell configuration information and/or the quantity of valid access times, performing cell handover according to the configuration information of the target handover cell includes: selecting the target handover cell for access within the valid time of cell configuration information and/or the quantity of valid access times.

In some embodiment, the selecting the target handover cell for access includes: selecting a non-continuous and same target handover cell for access; and/or selecting different target handover cells for access; and/or sorting cells or target handover cells configured by network according to a preset criteria, and sequentially selecting a target handover cell that meets a preset access threshold for access; and/or sorting the cells or target handover cells configured by the network according to a first preset criterion, selecting a cell with the highest ranking and meeting the preset access threshold as the target handover cell for access, and if the cell access fails, sorting the cells or target handover cells configured by the network according to a second preset criterion, selecting a cell with the highest ranking and meeting the preset access threshold as the target handover cell for access.

In some embodiment, the method further includes stopping the valid timer of cell configuration information when at least one following condition is met, and/or stopping the counter of valid access times when the at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the synchronization reconfiguration complete message of PSCell to a cell in the target cell set; wherein the terminal selects a non-preconfigured cell for access, the non-preconfigured cell is a cell other than the following cells: the target handover cell configured by the network device for the terminal and/or a current serving cell and/or a current serving base station cell, and the valid time of cell configuration information of the target handover cell has not expired and/or the quantity of valid access times of the target handover cell has not been reached.

In some embodiment, after the valid time of cell configuration information expires and/or the quantity of valid access times is reached, the method further includes: the terminal entering an idle state; the terminal triggering RRC re-establishment to a cell other than the following cells: the target handover cell configured by the network device for the terminal and/or a current serving cell and/or a current serving base station cell; the valid time of cell configuration information of other cells accessed by the terminal having not expired and/or the quantity of valid access times of the target handover cell having not reached; reporting SCG link failure.

In some embodiment, the terminal determines the cell access failure when at least one of the following is included: a random access failure within a preset time; or the media access control layer notifying the random access failure.

An embodiment of the present disclosure provides a cell handover processing method, which is applied to a first network device and includes: sending at least one of following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the method further includes: configuring, by the first network device, the valid time of cell configuration information for the terminal, the valid time of the cell configuration information being a valid duration configured for a target cell set configured by the first network device for the terminal; wherein, all target handover cells configured by the first network device for the terminal constitute the target cell set; or all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

In some embodiment, the method further includes: if a configuration duration of the cell configuration information of the target cell set exceeds a first preset duration, notifying the target handover cell in the target cell set to release configuration information of the terminal.

In some embodiment, the method further includes: configuring, by the first network device, the quantity of valid access times for the terminal, the quantity of valid access times being a maximum quantity of valid access times configured for a target cell set configured by the first network device for the terminal; wherein, all target handover cells configured by the first network device for the terminal constitute the target cell set; or all target handover cells configured by the first network device for the terminal through signaling carrying the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

An embodiment of the present disclosure provides a cell handover processing method, which is applied to a second network device and includes: sending at least one of the following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the method further includes: configuring, by the second network device, the valid time of cell configuration information for the terminal, the valid time of the cell configuration information being a valid duration configured for a target cell set configured by the second network device for the terminal; wherein, all target handover cells configured by the second network device for the terminal constitute the target cell set; or all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

In some embodiment, the method further includes: if a configuration duration of the cell configuration information of the target cell set exceeds a second preset duration, notifying the first network device to release the cell configuration information of the target cell set configured for the terminal.

In some embodiment, the method further includes: configuring, by the second network device, the quantity of valid access times for the terminal, the quantity of valid access times being a maximum quantity of valid access times configured for the target cell set configured by the second network device for the terminal, wherein, all target handover cells configured by the second network device for the terminal constitute the target cell set; or all target handover cells configured by the second network device for the terminal through signaling carrying the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

An embodiment of the present disclosure provides a terminal comprising: a transceiver, a memory, a processor, and a computer program stored on the memory and executed by the processor; wherein the processor executes the computer program to implement the following steps: obtaining configuration information of a target handover cell and at least one of the following information: valid time of cell configuration information or a quantity of valid access times; within the valid time of cell configuration information and/or the quantity of valid access times, performing cell handover according to the configuration information of the target handover cell.

In some embodiment, the valid time of cell configuration information is a valid duration configured for a target cell set configured by a network device for the terminal, all target handover cells configured by the network device for the terminal constitute the target cell set; or all target handover cells configured by the network device for the terminal through signaling that carries the valid time of cell configuration information constitute the target cell set; or each target handover cell or each group of target handover cells configured by the network device for the terminal respectively constitutes one target cell set; or each target handover cell or each group of target handover cells configured by the network device for the terminal through the signaling carrying the valid time of cell configuration information respectively constitutes one target cell set.

In some embodiment, the quantity of valid access times is a maximum quantity of valid access times configured for a target cell set configured by the network device for the terminal; all target handover cells configured by the network device for the terminal constitute the target cell set; or all target handover cells configured by the network device for the terminal through signaling carrying the quantity of valid access times constitute the target cell set; or each target handover cell or each group of target handover cells configured by the network device for the terminal respectively constitutes one target cell set; or each target handover cell or each group of target handover cells configured by the network device for the terminal through the signaling carrying the quantity of valid access times respectively constitutes one target cell set.

In some embodiment, the processor further executes the computer program to implement the following step: within the valid time of cell configuration information and/or the quantity of valid access times, sending an access request message to the target handover cell selected by the terminal, wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

In some embodiment, the processor further executes the computer program to implement the following step: starting a valid timer of cell configuration information and/or a counter of valid access times for the target cell set at a preset start time; wherein the preset start time includes at least one of the following: a moment when the terminal receives signaling including the valid time of cell configuration information; a moment when the terminal receives signaling including the quantity of valid access times; a moment when the terminal receives signaling including the configuration information of the target handover cell; or a moment when the terminal initiates an access request in the target cell set for a first time, wherein a duration of the valid timer of cell configuration information is the valid time of cell configuration information, and a maximum quantity of the counter of the valid access times is the quantity of valid access times.

In some embodiment, the processor further executes the computer program to implement the following step: selecting the target handover cell for access within the valid time of cell configuration information and/or the quantity of valid access times.

In some embodiment, the processor further executes the computer program to implement the following steps: selecting a non-continuous and same target handover cell for access; and/or selecting different target handover cells for access; and/or sorting cells or target handover cells configured by network according to a preset criteria, and sequentially selecting a target handover cell that meets a preset access threshold for access; and/or sorting the cells or target handover cells configured by the network according to a first preset criterion, selecting a cell with the highest ranking and meeting the preset access threshold as the target handover cell for access, and if the cell access fails, sorting the cells or target handover cells configured by the network according to a second preset criterion, selecting a cell with the highest ranking and meeting the preset access threshold as the target handover cell for access.

In some embodiment, the processor further executes the computer program to implement the following steps: stopping the valid timer of cell configuration information when at least one following condition is met, and/or stopping the counter of valid access times when the at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the synchronization reconfiguration complete message of PSCell to a cell in the target cell set; wherein the terminal selects a non-preconfigured cell for access, the non-preconfigured cell is a cell other than the following cells: the target handover cell configured by the network device for the terminal and/or a current serving cell and/or a current serving base station cell, and the valid time of cell configuration information of the target handover cell has not expired and/or the quantity of valid access times of the target handover cell has not been reached.

In some embodiment, the processor further executes the computer program to implement the following steps: after the valid time of cell configuration information expires and/or the quantity of valid access times is reached, the method further includes: the terminal entering an idle state; the terminal triggering RRC re-establishment to a cell other than the following cells: the target handover cell configured by the network device for the terminal and/or a current serving cell and/or a current serving base station cell; the valid time of cell configuration information of other cells accessed by the terminal having not expired and/or the quantity of valid access times of the target handover cell having not reached; reporting SCG link failure.

In some embodiment, the processor further executes the computer program to implement the following step: the terminal determines the cell access failure when at least one of the following is included: a random access failure within a preset time; or the media access control layer notifying the random access failure.

An embodiment of the present disclosure provides a terminal, includes: an obtaining module, configured to obtain configuration information of a target handover cell and at least one of the following information: valid time of cell configuration information or a quantity of valid access times; a handover module, configured to, within the valid time of cell configuration information and/or the quantity of valid access times, perform cell handover according to the configuration information of the target handover cell.

In some embodiment, the valid time of cell configuration information is a valid duration configured for a target cell set configured by a network device for the terminal, all target handover cells configured by the network device for the terminal constitute the target cell set; or all target handover cells configured by the network device for the terminal through signaling that carries the valid time of cell configuration information constitute the target cell set; or each target handover cell or each group of target handover cells configured by the network device for the terminal respectively constitutes one target cell set; or each target handover cell or each group of target handover cells configured by the network device for the terminal through the signaling carrying the valid time of cell configuration information respectively constitutes one target cell set.

In some embodiment, the quantity of valid access times is a maximum quantity of valid access times configured for a target cell set configured by the network device for the terminal; all target handover cells configured by the network device for the terminal constitute the target cell set; or all target handover cells configured by the network device for the terminal through signaling carrying the quantity of valid access times constitute the target cell set; or each target handover cell or each group of target handover cells configured by the network device for the terminal respectively constitutes one target cell set; or each target handover cell or each group of target handover cells configured by the network device for the terminal through the signaling carrying the quantity of valid access times respectively constitutes one target cell set.

In some embodiment, the handover module includes: a sending unit, configured to, within the valid time of cell configuration information and/or the quantity of valid access times, send an access request message to the target handover cell selected by the terminal, wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

In some embodiment, the terminal further includes: a starting module, configured to start a valid timer of cell configuration information and/or a counter of valid access times for the target cell set at a preset start time; wherein the preset start time includes at least one of the following: a moment when the terminal receives signaling including the valid time of cell configuration information; a moment when the terminal receives signaling including the quantity of valid access times; a moment when the terminal receives signaling including the configuration information of the target handover cell; or a moment when the terminal initiates an access request in the target cell set for a first time, wherein a duration of the valid timer of cell configuration information is the valid time of cell configuration information, and a maximum quantity of the counter of the valid access times is the quantity of valid access times.

In some embodiment, the handover module includes: a selection unit, configured to select the target handover cell for access within the valid time of cell configuration information and/or the quantity of valid access times.

In some embodiment, the selection unit is specifically configured to: select a non-continuous and same target handover cell for access; and/or select different target handover cells for access; and/or sort cells or target handover cells configured by network according to a preset criteria, and sequentially select a target handover cell that meets a preset access threshold for access; and/or sort the cells or target handover cells configured by the network according to a first preset criterion, select a cell with the highest ranking and meeting the preset access threshold as the target handover cell for access, and if the cell access fails, sort the cells or target handover cells configured by the network according to a second preset criterion, select a cell with the highest ranking and meeting the preset access threshold as the target handover cell for access.

In some embodiment, the terminal further includes: a stopping module, configured to stop the valid timer of cell configuration information when at least one following condition is met, and/or stop the counter of valid access times when the at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the synchronization reconfiguration complete message of PSCell to a cell in the target cell set; wherein the terminal selects a non-preconfigured cell for access, the non-preconfigured cell is a cell other than the following cells: the target handover cell configured by the network device for the terminal and/or a current serving cell and/or a current serving base station cell, and the valid time of cell configuration information of the target handover cell has not expired and/or the quantity of valid access times of the target handover cell has not been reached.

In some embodiment, the terminal further includes: a processing module, configured to implement at least one of the following: the terminal entering an idle state; or the terminal triggering RRC re-establishment a cell other than the following cells: the target handover cell configured by the network device for the terminal and/or a current serving cell and/or a current serving base station cell; the valid time of cell configuration information of other cells accessed by the terminal having not expired and/or the quantity of valid access times of the target handover cell having not reached; reporting SCG link failure.

In some embodiment, the terminal further includes: a determining module, configured to determine the cell access failure when at least one of the following is included: a random access failure within a preset time; or the media access control layer notifying the random access failure.

An embodiment of the present disclosure provides a first network device, includes: a transceiver, a memory, a processor, and a computer program stored on the memory and executed by the processor; wherein the transceiver is configured to: send at least one of following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the processor executes the computer program to implement the following steps: configuring, by the first network device, the valid time of cell configuration information for the terminal, the valid time of the cell configuration information being a valid duration configured for a target cell set configured by the first network device for the terminal; wherein, all target handover cells configured by the first network device for the terminal constitute the target cell set; or all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

In some embodiment, the processor executes the computer program to implement the following step: if a configuration duration of the cell configuration information of the target cell set exceeds a first preset duration, notifying the target handover cell in the target cell set to release configuration information of the terminal.

In some embodiment, the processor further executes the computer program to implement the following step: configuring, by the first network device, the quantity of valid access times for the terminal, the quantity of valid access times being a maximum quantity of valid access times configured for a target cell set configured by the first network device for the terminal; wherein, all target handover cells configured by the first network device for the terminal constitute the target cell set; or all target handover cells configured by the first network device for the terminal through signaling carrying the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

An embodiment of the present disclosure provides a first network device, includes: a first sending module, configured to send at least one of following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the first network device further includes: a first configuration module, configured to configure, by the first network device, the valid time of cell configuration information for the terminal, the valid time of the cell configuration information being a valid duration configured for a target cell set configured by the first network device for the terminal; wherein, all target handover cells configured by the first network device for the terminal constitute the target cell set; or all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

In some embodiment, the first network device further includes: a first notification module, configured to, if a configuration duration of the cell configuration information of the target cell set exceeds a first preset duration, notify the target handover cell in the target cell set to release configuration information of the terminal.

In some embodiment, the first network further includes: a second configuration module, configured to configure, by the first network device, the quantity of valid access times for the terminal, the quantity of valid access times being a maximum quantity of valid access times configured for a target cell set configured by the first network device for the terminal; wherein, all target handover cells configured by the first network device for the terminal constitute the target cell set; or all target handover cells configured by the first network device for the terminal through signaling carrying the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

An embodiment of the present disclosure provides a second network device, includes: a transceiver, a memory, a processor, and a computer program stored on the memory and executed by the processor; wherein the transceiver is configured to: sending at least one of the following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the processor executes the computer program to implement the following step: configuring, by the second network device, the valid time of cell configuration information for the terminal, the valid time of the cell configuration information being a valid duration configured for a target cell set configured by the second network device for the terminal; wherein, all target handover cells configured by the second network device for the terminal constitute the target cell set; or all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

In some embodiment, the processor executes the computer program to implement the following step: if a configuration duration of the cell configuration information of the target cell set exceeds a second preset duration, notifying the first network device to release the cell configuration information of the target cell set configured for the terminal.

In some embodiment, the processor executes the computer program to implement the following step: configuring, by the second network device, the quantity of valid access times for the terminal, the quantity of valid access times being a maximum quantity of valid access times configured for the target cell set configured by the second network device for the terminal, wherein, all target handover cells configured by the second network device for the terminal constitute the target cell set; or all target handover cells configured by the second network device for the terminal through signaling carrying the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

An embodiment of the present disclosure provides a second network device, includes: a second sending module, configured to send at least one of the following information to a terminal: valid time of cell configuration information; a quantity of valid access times; or configuration information of a target handover cell.

In some embodiment, the information is used to enable the terminal to perform cell handover according to the configuration information of target handover cell within the valid time of the cell configuration information and/or the quantity of valid access times.

In some embodiment, the second network device further includes: a third configuration module, configured to configure, by the second network device, the valid time of cell configuration information for the terminal, the valid time of the cell configuration information being a valid duration configured for a target cell set configured by the second network device for the terminal; wherein, all target handover cells configured by the second network device for the terminal constitute the target cell set; or all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

In some embodiment, the second network device further includes: a second notification module, configured to, if a configuration duration of the cell configuration information of the target cell set exceeds a second preset duration, notify the first network device to release the cell configuration information of the target cell set configured for the terminal.

In some embodiment, the second network device further includes: a fourth configuration module, configured to configure, by the second network device, the quantity of valid access times for the terminal, the quantity of valid access times being a maximum quantity of valid access times configured for the target cell set configured by the second network device for the terminal, wherein, all target handover cells configured by the second network device for the terminal constitute the target cell set; or all target handover cells configured by the second network device for the terminal through signaling carrying the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

An embodiment of the present disclosure provides a computer-readable storage medium having a computer program stored thereon, wherein the computer program is executed by a processor to implement the cell handover processing method.

The present disclosure has the following beneficial effects.

According to the embodiments of the present disclosure, configuration information of target handover cell and at least one of the following information are obtained: valid time of cell configuration information or the quantity of valid access times; within the valid time of cell configuration information and/or the quantity of valid access times, performs cell handover according to the configuration information of target handover cell. In this way, after the terminal handover access fails, within the valid time of cell configuration information and/or the quantity of valid access times, multiple access attempts may be performed according to the configuration information of target handover cell, thereby preventing the terminal from directly entering the idle state or triggering the reconstruction process of other cells, and reducing the data interruption time delay.

BRIEF DESCRIPTION OF THE DRAWINGS

In order to explain the technical solutions of the embodiments of the present disclosure more clearly, the following will briefly introduce the drawings that need to be used in the description of the embodiments of the present disclosure. Obviously, the drawings in the following description are only some embodiments of the present disclosure. For those of ordinary skill in the art, other drawings can be obtained based on these drawings without creative work.

DETAILED DESCRIPTION

In order to make the technical problem to be solved, the technical solutions and the advantages of the present disclosure more clearly, the present disclosure will be described hereinafter in a clear and complete manner in conjunction with the drawings and embodiments.

Figure 1:
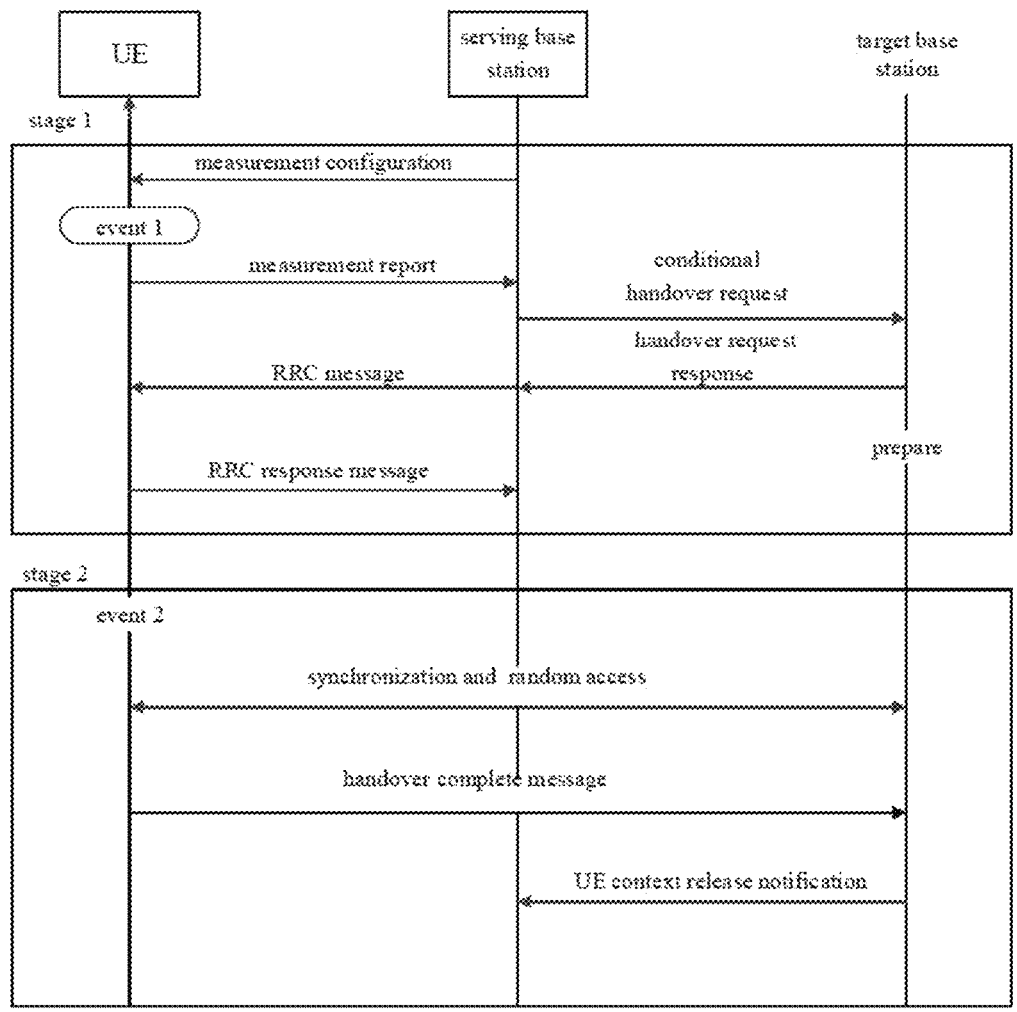
FIG. 1 is a schematic diagram of a related conditional handover process.

First, before describing the specific implementation process of the method of the present disclosure, it should be noted that the method of the present disclosure can be applied to the conditional handover procedure shown in FIG. 1, or a PSCell change procedure in which a plurality Primary SCG Cells (PSCell) is configured for the UE. The present disclosure is not limited to the above two scenarios. Taking conditional handover as an example, the specific handover steps are as follows.

Here, conditional handover is divided into two stages, stage 1 includes the following steps.

S11: A serving base station performs measurement configuration for the UE, the measurement configuration at least includes measurement configuration of the pre-configured event 1 that triggers the conditional handover.

S12: If the measurement meets event 1, and the UE triggers a measurement report to the serving base station.

S13: The serving base station prepares a pre-configured target handover cell for the UE according to the measurement report, and the serving base station sends a handover request message to the target base station;

Wherein, the handover request message carries indication information of conditional handover. The serving base station may configure a plurality of pre-configured target handover cells for the UE according to the measurement report.

S14: If the target base station determines to access the UE, a handover command for conditional handover is generated for the UE, and a handover request response is sent to the current serving base station of the UE.

S15: The serving base station sends a Radio Resource Control (RRC) message including a pre-configured conditional handover command of the target handover cell to the UE.

S16: The UE sends an RRC response message to the serving base station.

Stage 2 includes the process of triggering the handover:

S17: If the measurement meets event 2, UE triggers the conditional handover, UE synchronizes and triggers a random access process to the target handover cell that meets the handover condition;

The target handover cell is one of the pre-configured target handover cells configured for the UE by the serving base station in stage 1, and the target handover cell is a cell under the target base station.

S18: The UE sends a handover complete message to the target handover cell to complete the handover process.

S19: After receiving the handover completion message of the UE, the target base station sends a UE context release notification to a source serving cell under the current serving base station of the UE to notify the source serving cell to release the UE context.

Figure 2:
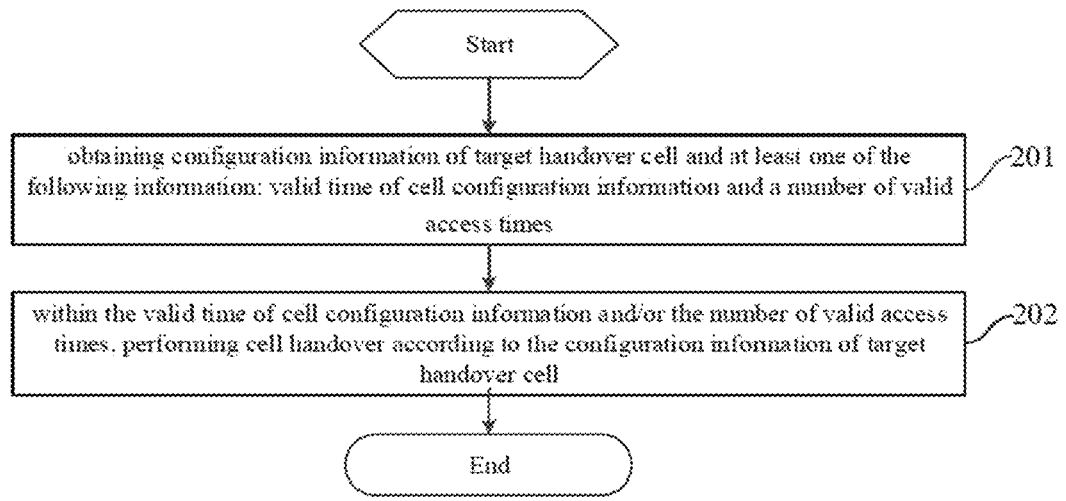
FIG. 2 is a schematic flowchart of a cell handover processing method according to an embodiment of the disclosure.

As shown in FIG. 2, a cell handover processing method is provided for an embodiment of the present disclosure, which is applied to a terminal, and includes the following steps.

Step 201: obtaining configuration information of target handover cell and at least one of the following information: valid time of cell configuration information or a quantity of valid access times.

In this step, the configuration information of target handover cell includes: the configuration information of the target handover cell pre-configured by a network device for the terminal.

It should be noted that the valid time of cell configuration information and/or the quantity of valid access times are configured by the network or defined by the protocol. The network configuration may be configured by the first network device, that is, the serving cell, or configured by the second network device, that is, the target handover cell, the network configuration is sent by the first network device to the terminal.

Here, if the valid time of cell configuration information and/or the quantity of valid access times are configured by the network, the valid time of cell configuration information and/or the quantity of valid access times can be sent through the same handover configuration information as the configuration information of target handover cell, or separately set by the first network device through different handover configuration information, or sent by the first network device or the second network device to the UE through system information broadcasting, which is not specifically limited here.

Step 202: Within the valid time of cell configuration information and/or the quantity of valid access times, performing cell handover according to the configuration information of target handover cell.

In this step, within the valid time of cell configuration information and/or the quantity of valid access times, the cell handover is performed according to the configuration information of target handover cell, that is, the target access cell is selected from the target handover cells pre-configured by the network device for the terminal, the cell handover is implemented according to the configuration information of the cell, which can prevent the terminal from continuously selecting the target access cell from the pre-configured target handover cells when the target configuration cell is not the optimal target access cell, which may cause greater data interruption delay.

The cell handover processing method of the embodiment of the present disclosure obtains configuration information of target handover cell and at least one of the following information: valid time of cell configuration information and/or the quantity of valid access times; within the valid time of cell configuration information and/or the quantity of valid access times, performs cell handover according to the configuration information of target handover cell. In this way, after the terminal handover access fails, within the valid time of cell configuration information and/or the quantity of valid access times, multiple access attempts may be performed according to the configuration information of target handover cell, thereby preventing the terminal from directly entering the idle state or triggering the reestablishment process of other cells, and reducing the data interruption time delay.

Optionally, the valid time of cell configuration information is a valid duration configured for a target cell set configured by the network device for the terminal.

Wherein, all target handover cells configured by the network device for the terminal constitute the target cell set; or, all target handover cells configured by the network device for the terminal through signaling that carries the valid time of cell configuration information constitute the target cell set; or each target handover cell or each group of target handover cells configured by the network device for the terminal respectively constitutes one target cell set; or each target handover cell or each group of target handover cells configured by the network device for the terminal through the signaling carrying the valid time of cell configuration information respectively constitutes one target cell set.

It should be noted that a timer can be used to implement cell handover within the valid time of cell configuration information. The valid time of cell configuration information may be determined by the first network device, that is, the serving cell, and configured for the terminal, or determined by the second network device, that is, the target handover cell, and sent to the termi al through the first network device. The configuration information of the target handover cell is sent by the first network device to the terminal, or is determined by the second network device, and transmitted through the first network device to the terminal, or reorganized and sent to the terminal by the first network device.

Here, specifically, the network device configures a timer for all target handover cells configured by the terminal.

Alternatively, the network device configures a timer for all target handover cells configured for the terminal through the signaling carrying the valid time of cell configuration information, where there may be one or more signaling carrying the valid time of cell configuration information. That is, the signaling carrying the configuration information of the target handover cell carries one valid time of cell configuration information associated with the configuration information of all the target handover cells configured in the signaling, that is, each command that configures the configuration information of the target handover cell configures one valid time of cell configuration information. When the configuration information of target handover cell is sent to the UE through N signaling, there are N valid times, where N is an integer greater than or equal to 1, that is, there are N timers, and each tinier maintains a group of pre-configured target handover cells in the signaling carrying the valid time of cell configuration information.

Alternatively, the network device configures a timer for each target handover cell or each group of target handover cells configured for the terminal;

Alternatively, the network device configures a timer for each target handover cell or each group of target handover cells configured for the terminal through the signaling carrying the valid time of cell configuration information. That is, the network device configures a valid time for each target handover cell configured for the terminal through signaling, that is, the UE sets a timer for each target handover cell. Or the network device configures a valid time for each group of target handover cells configured for the terminal through signaling, that is, the UE sets a timer for each group of target handover cells, and a signaling can include N groups of target handover cells configured for the terminal. N is greater than or equal to 1, and each group of target handover cells may include L target handover cells, and L is greater than or equal to 1.

Optionally, the quantity of valid access times is the maximum quantity of valid access times configured for the target cell set configured by the network device for the terminal;

Wherein, all target handover cells configured by the network device for the terminal constitute the target cell set; or all target handover cells configured by the network device for the terminal through signaling carrying the quantity of valid access times constitute the target cell set; or each target handover cell or each group of target handover cells configured by the network device for the terminal respectively constitutes one target cell set; or each target handover cell or each group of target handover cells configured by the network device for the terminal through the signaling carrying the quantity of valid access times respectively constitutes one target cell set.

It should be noted that a counter can be used to implement cell handover within the quantity of valid access times. The quantity of valid access times may be determined by the first network device, that is, the serving cell, and configured for the terminal, or determined by the second network device, that is, the target handover cell, and sent to the terminal through the first network device. The configuration information of the target handover cell is sent by the first network device to the terminal, and may be determined by the second network device, and sent to the terminal through the first network device, or reorganized and sent by the first network device to the terminal.

Here, specifically, one counter is configured for all target handover cells configured by the network device to the terminal.

Alternatively, the network device configures one counter for all target handover cells configured for the terminal through the signaling carrying the quantity of valid access times, where there may be one or more signaling carrying the quantity of valid access times. That is, the signaling carrying the configuration information of the target handover cell carries one valid access times associated with the configuration information of all the target handover cells configured in the signaling, that is, each command that configures the configuration information of the target handover cell configures one valid access times of the cell configuration information. When the configuration information of target handover cell is sent to the UE through N signaling, there are N valid access times, where N is an integer greater than or equal to 1, that is, there are N counters, and each counter maintains a group of pre-configured target handover cells in the signaling carrying the quantity of valid access times.

Alternatively, the network device configures one counter for each target handover cell or each group of target handover cells configured for the terminal.

Alternatively, the network device configures one counter for each target handover cell or each group of target handover cells configured for the terminal through the signaling carrying the quantity of valid access times. That is, the network device configures one valid access times for each target handover cell configured for the terminal through signaling, that is, the UE sets a counter for each target handover cell. Or the network device configures one valid access times for each group of target handover cells configured for the terminal through signaling, that is, the UE sets a counter for each group of target handover cells, and a signaling can include N groups of target handover cells configured for the terminal. N is greater than or equal to 1, and each group of target handover cells may include L target handover cells, and L is greater than or equal to 1.

Based on the embodiment shown in FIG. 2, in an embodiment of the present disclosure, step 202 may further include: within the valid time of cell configuration information and/or the quantity of valid access times, sending an access request message to a target handover cell selected by the terminal.

The access request message includes at least one of the following: a handover complete message, an RRC reestablishment request message, an RRC resume request message, or synchronization reconfiguration complete message of a primary cell PSCell of the secondary cell group SCG.

As an optional implementation, the method may further include: starting a valid timer of cell configuration information and/or a counter of valid access times for the target cell set at a preset start time;

Wherein, the preset start time includes at least one of the following: a moment when the terminal receives signaling including the valid time of cell configuration information; a moment when the terminal receives signaling including the quantity of valid access times; a moment when the terminal receives the signaling including the configuration information of the target handover cell; or a moment when the terminal initiates an access request in the target cell set for the first time.

Wherein, the duration of the valid timer of cell configuration information is the valid time of cell configuration information, and the maximum quantity of the counter of the valid access times is the quantity of valid access times.

In another optional embodiment of the present disclosure, step 202 may further include: selecting a target handover cell for access within the valid time of cell configuration information and/or the quantity of valid access times.

Specifically, selecting the target handover cell for access may include: selecting a non-continuous and same target handover cell for access; and/or selecting different target handover cells for access; and/or sorting cells or target handover cells configured by the network according to a preset criteria, and sequentially selecting a target handover cell that meets a preset access threshold for access; and/or sorting the cells or target handover cells configured by the network according to a first preset criterion, selecting a cell with the highest ranking and meeting the preset access threshold as the target handover cell for access, and if the cell access fails, sorting the cells or target handover cells configured by the network according to a second preset criterion, selecting a cell with the highest ranking and meeting the preset access threshold as the target handover cell for access.

It should be noted that the preset criteria include cell reselection criteria or priority of network configuration. Here, the cell reselection criterion is, for example, the R criterion for cell reselection.

In addition, the preset access threshold is specified by the network configuration or protocol. For example, in the process of conditional handover, the condition for performing handover configured by the network, or the access threshold configured by the network through other signaling.

In an optional embodiment, the valid time timer of cell configuration information stops when at least one following conditions is met, and/or the counter of valid access times stops when at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the synchronization reconfiguration complete message of PSCell to a cell in the target cell set.

The terminal selects a non-preconfigured cell for access, where the non-preconfigured cell is a cell other than the following cells: the target handover cell configured by the network device for the terminal and/or the current serving cell and/or the current serving base station cell, and the valid time of cell configuration information of the target handover cell has not expired and/or the quantity of valid access times of the target cell has not been reached.

As an optional implementation, after the valid time of cell configuration information expires and/or the quantity of valid access times is reached, the method may further include that: the terminal enters an idle state; the terminal triggers RRC re-establishment to a cell other than the following cells: the target handover cell configured by the network device for the terminal and/or the current serving cell and/or the current serving base station cell; the valid time of cell configuration information of other cells accessed by the terminal has not expired and/or the quantity of valid access times has not reached; SCG link failure is reported.

The following takes the configuration of different timers and/or different counters in combination with different starting scenarios as examples to specifically describe the implementation of the method of the present disclosure. The conditional handover is taken as an example.

Example 1: Only one timer and/or one counter is configured, and it is started when the first RRC message including the configuration information of the target handover cell is received, for example, when the configuration message of the conditional handover is configured.

Step 111: The serving base station gNB1 cell1 configures the measurement configuration for the UE, including the measurement configuration of event 1 and/or the measurement of event 2;

Among them, the measurement of event 1 is used for the serving base station to select the pre-configured target handover cell of condition handover, and the measurement of event 2 is used for the UE to trigger the handover.

Step 112: The UE performs measurement according to the network configuration, and a cell measurement that meets event 1 triggers the UE to report a measurement report.

Step 113: The serving base station obtains the measurement report of the UE, and prepares a pre-configured target handover cell of conditional handover for the UE according to the measurement report.

Wherein, the quantity of pre-configured target handover cells is at least one. For example, there are 3 cells, which includes cell2, cell3, and cell4. The serving base station sends the RRC message containing the conditional handover command of the configuration information of the pre-configured target handover cell to the UE. The configuration information of the target handover cell is determined by the target cell, and is transmitted to the UE by the serving cell through the conditional handover command, or sent to the UE through reorganizing by the serving cell into the conditional handover command.

Wherein, the RRC message also includes the valid duration t, or the valid duration of system information broadcast t, where t is determined by the target handover base station or the serving base station, or the valid duration t is specified in the protocol; and/or the RRC message also include the maximum quantity of access request times n, or the maximum quantity of access request times n for system information broadcasting, where n is determined by the target handover base station or the serving base station, or the maximum quantity of access request times n is specified by the protocol.

Here, the RRC message may contain the measurement configuration of event 2.

Step 114: The UE receives the RRC message containing the conditional handover command of the pre-configured target handover cell, and starts the timer T and/or the counter. The duration of the timer T is t, and the maximum quantity of the counter is n.

Step 115: UE performs measurement, where the measurement of cell2 meets event 2, the UE is triggered to initiate a handover. The UE synchronizes and initiates a random access procedure to cell2, but the UE failed to access cell2.

If only one timer or counter is configured, after step 115, it may also include:

Step 116-1: If T has not expired or the counter has not reached the maximum quantity of access request times n, the UE can perform the following steps:

The UE switching to cell2, cell3, cell4 by sending a handover complete message, or reestablishing to cell2, cell3, cell4 by sending an RRC reestablishment request message, or recovering to cell2, cell3, cell4 by sending an RRC resume request message until T expires or the counter reaches the maximum quantity of access request times n; and/or reestablishing to gNB1 and/or reestablishing to other cells except cell2, cell3, cell4, gNB1 until T expires or the counter reaches the maximum quantity of access request times n.

Among them, each time the UE initiates an access attempt, the counter is incremented by 1

Step 117-1: If T has not expired or the counter has not reached the maximum quantity of access request times n, and the UE has successfully implemented handover or reestablishing or resume; for SCG, the PSCell synchronization reconfiguration is completed successfully, then the timer or counter is stopped and the configuration information of other pre-configured cells is released.

Step 118-1: If T expires or the counter reaches the maximum quantity of access request times n, the UE may perform at least one of the following steps:

The UE enters the idle state;

The UE triggers RRC re-establishment to other cells except cell2, cell3, cell4, and gNB1; or If it is an SCG PSCell, SCG link failure is reported.

If a timer and a counter are configured, after step 115, it may also include:

Step 116-2: If T has not expired and the counter has not reached the maximum quantity of access request times n, the UE may perform the following steps:

The UE is switched to cell2, cell3, cell4 by sending a handover complete message, or reestablished to cell2, cell3, cell4 by sending an RRC reestablishing request message, or recovered to cell2, cell3, cell4 by sending an RRC resume request message until T expires or the counter reaches the maximum quantity of access request times n; and/or reestablished to gNB1 and/or reestablished to other cells except cell2, cell3, cell4, gNB1 until T expires or the counter reaches the maximum quantity of access request times n.

Among them, each time the UE initiates an access attempt, the counter is incremented by 1.

Step 117-2: If T has not expired and the counter has not reached the maximum quantity of access request times n, and the UE is successfully switched, reestablished or recovered; for SCG, the PSCell synchronization reconfiguration is completed successfully, then timer and the counter are stopped, and the handover commands for other pre-configured cells are released.

Step 118-2: If T does not expire but the counter reaches the maximum quantity of access request times n, or the counter does not reach the maximum quantity of access request times n but T expires, the UE may perform at least one of the following steps:

The UE enters the idle state;

The UE triggers RRC re-establishment to other cells except cell2, cell3, cell4, and gNB1; or If it is an SCG PSCell, SCG link failure is reported.

Example 2: a timer and/or a counter is configured for each RRC message, and started when receiving an RRC message for configuring conditional handover.

Step 221: the serving base station gNB1 cell1 configures a measurement configuration for the UE, including the measurement configuration of event 1 and/or the measurement of event 2;

Among them, the measurement of event 1 is used for the serving base station to select the pre-configured target handover cell of condition handover, and the measurement of event 2 is used for the UE to trigger the handover.

Step 222: The UE performs measurement according to the network configuration, and a cell measurement that meets event 1 triggers the UE to report a measurement report.

Step 223: The serving base station obtains the measurement report of the UE, and prepares a pre-configured target handover cell of conditional handover for the UE according to the measurement report.

Wherein, the quantity of pre-configured target handover cells is at least one. For example, there are 2 cells, which includes cell2 and cell3. The serving base station sends the RRC message containing the conditional handover command of the pre-configured target handover cell to the UE. The configuration information of the target handover cell is determined by the target cell, and is transmitted to the UE by the serving cell through the conditional handover command, or sent to the UE through reorganizing by the serving cell into the conditional handover command.

Wherein, the RRC message also includes the valid duration t1, or the valid duration of system information broadcast t1, where t1 is determined by the target handover base station or the serving base station, or the valid duration t1 is specified in the protocol; and/or the RRC message also include the maximum quantity of access request times n1, or the maximum quantity of access request times n1 for system information broadcasting, where n1 is determined by the target handover base station or the serving base station, or the maximum quantity of access request times n1 is specified by the protocol.

Here, the RRC message may contain the measurement configuration of event 2.

Step 224: The UE receives the RRC message containing the conditional handover command of the pre-configured target handover cell, and starts the timer T1 and/or the counter N1. The duration of the timer T1 is t1, and the maximum quantity of the counter N1 is n1.

Step 225: The UE performs measurement according to the network configuration, and the measurement of cell 4 meets event 1 to trigger the UE to report a measurement report.

Step 226: The serving base station obtains the measurement report of the UE, and prepares a pre-configured target handover cell of conditional handover for the UE according to the measurement report. The serving base station sends the RRC message containing the conditional handover command of the pre-configured target handover cell cell4 to the UE. The configuration information of the target handover cell is determined by the target cell, and is transmitted to the UE by the serving cell through the conditional handover command, or sent to the UE through reorganizing by the serving cell into the conditional handover command.

Wherein, the RRC message also contains the valid duration t2, or the valid duration of system information broadcast t2, where t2 is determined by the serving base station or the target handover base station, or the valid duration t2 is specified by the protocol; and/or the RRC message also includes the maximum quantity of access request times n2, or the maximum quantity of access request times n2 for system information broadcasting, where n2 is determined by the serving base station or the target handover base station, or the maximum quantity of access request times n2 is specified by the protocol.

In the case of being specified by the protocol or system information broadcasting, the protocol or system information broadcasting may only include a valid duration or the maximum quantity of access request times. At this time, t1 is the same as t2, and n1 is the same as n2.

Here, the RRC message may contain the measurement configuration of event 2.

Step 227: The UE receives the RRC message containing the conditional handover command of the pre-configured target handover cell cell4, and starts the timer T2 and/or the counter N2. The duration of timer T2 is t2, and the maximum quantity of counter N2 is n2.

Step 228: UE performs measurement, where the measurement of cell2 meets event 2 to trigger the UE to initiate a handover. The UE synchronizes and initiates a random access procedure to cell2, but the UE failed to access cell2.

If a timer is configured for each RRC message or a counter is configured for each RRC message, after step 228, the method may further include:

Step 229-1: If T1 and T2 have not expired, or the maximum quantity of access request times n1 and n2 has not been reached, the UE may perform the following steps:

The UE can be switched to cell2, cell3, cell4 by sending a handover complete message, or reestablished to cell2, cell3, cell4 by sending an RRC reestablishment request message, or recovered to cell2, cell3, cell4 by sending an RRC resume request message, until T1 expires or the quantity of access times of cell2 and cell3 reaches the maximum quantity of access request times n1 or the quantity of access times of UE to cell2, cell3 and other cells reaches the maximum quantity of access request times n1, then no more attempts to access cell2 and cell3 again until T2 expires or if the quantity of access times to cell4 reaches the maximum quantity of access request times n2 or the quantity of access times of UE to cell4 and other cells reaches the maximum quantity of access request times n2, then no more attempts to access cell4; and/or, reestablished to gNB1 and/or reestablished to other cells except cell2, cell3, cell4, gNB1 until T1 or T2 expires, or until the maximum quantity of access request times n1 or n2 is reached; among them, every time the UE initiates an access attempt, then corresponding counter is incremented by 1.

Step 230-1: If T1 or T2 has not expired, or the maximum quantity of access request times n1 and n2 has not been reached, and the UE is successfully switched, reestablished or recovered; for SCG, the PSCell synchronization reconfiguration is completed successfully, then timer T1 and T2 are stopped, and the configuration information of other pre-configured cells are released, and the counter N1 and N2 are stopped and the configuration information of other pre-configured cells are released.

Step 231-1: If T1 and T2 expire, or the maximum quantity of access request times n1 and n2 are reached, the UE may perform at least one of the following steps.

The UE enters the idle state.

The UE triggers RRC re-establishment to other cells except cell2, cell3, cell4, and gNB1.

If it is an SCG PSCell, SCG link failure is reported.

If a timer and a counter are configured for each RRC message, after step 228, it may further include:

Step 229-2: If T1 and T2 have not expired and the maximum quantity of access request times n1 and n2 have not been reached, the UE may perform the following steps:

The UE can be switched to cell2, cell3, cell4 by sending a handover complete message, or reestablished to cell2, cell3, cell4 by sending an RRC reestablishment request message, or recovered to cell2, cell3, cell4 by sending an RRC resume request message, until T1 expires or the quantity of access times of UE to cell2 and cell3 reaches the maximum quantity of access request time s n1 or the quantity of access times of UE to cell2, cell3 and other cells reaches the maximum quantity of access request times n1, then no more attempts to access cell2 and cell3 again until T2 expires or if the quantity of access times to cell4 reaches the maximum quantity of access request times n2 or the quantity of access times of UE to cell4 and other cells reaches the maximum quantity of access request times n2, then no more attempts to access cell4; and/or, reestablished to gNB1 and/or reestablished to other cells except cell2, cell3, cell4, gNB1 until T1 or T2 expires, or until the maximum quantity of access request times n1 or n2 is reached; every time the UE initiates an access attempt, then the corresponding counter is incremented by 1.

Step 230-2: If T1 or T2 has not expired, and the maximum quantity of access request times n1 or n2 has not been reached, and the UE is successfully switched or reestablished or recovered; for SCG, the PSCell synchronization reconfiguration is completed successfully, then timers T1 and T2 and counters N1 and N2 are stopped, and other pre-configured cell configuration information are released.

Step 231-2: If T1 has not expired but the maximum quantity of access request times n1 has been reached, or the maximum quantity of access request times n1 has not been reached but T1 has expired, and T2 has not expired but the maximum quantity of access request times n2 has been reached, or the maximum quantity of access request times n2 has not been reached but T2 has expired, the UE can perform at least one of the following steps:

The UE enters the idle state;

The UE triggers RRC re-establishment to other cells except cell2, cell3, cell4, and gNB1; or If it is an SCG PSCell, SCG link failure is reported.

Example 3: a timer and/or a counter is configured for each pre-configured target handover cell, and started when receiving an RRC message for configuring conditional handover Step 331: the serving base station gNB1 cell1 configures a measurement configuration for the UE, including the measurement configuration of event 1 and/or the measurement of event 2;

Among them, the measurement of event 1 is used for the serving base station to select the pre-configured target handover cell of condition handover, and the measurement of event 2 is used for the UE to trigger the handover.

Step 332: The UE performs measurement according to the network configuration, and a cell measurement that meets event 1 triggers the UE to report a measurement report.

Step 333: The serving base station obtains the measurement report of the UE, and prepares a pre-configured target handover cell of conditional handover for the UE according to the measurement report.

Wherein, the quantity of pre-configured target handover cells is at least one. For example, there are 3 cells, which includes cell2, cell3 and cell4. The serving base station sends the RRC message containing the conditional handover command of the pre-configured target handover cell to the UE. The configuration information of the target handover cell is determined by the target cell, and is transmitted to the UE by the serving cell through the conditional handover command, or sent to the UE through reorganizing by the serving cell into the conditional handover command.

Wherein, the RRC message also includes the valid duration t1, t2, t3, or the valid duration of system information broadcast t1, t2, t3, where t1, t2, t3 is determined by the target handover base station or the serving base station, or the valid duration t1, t2, t3 is specified in the protocol; and/or the RRC message also include the maximum quantity of access request times n1, n2, n3, or the maximum quantity of access request times n1, n2, n3 for system information broadcasting, where n1, n2, n3 is determined by the target handover base station or the serving base station, or the maximum quantity of access request times n1, n2, n3 is specified by the protocol.

In the case of being specified by the protocol or system information broadcasting, the protocol or system information broadcasting may only include a valid duration or the maximum quantity of access request times. At this time, t1, t2 and t3 are the same, and n1, n2 and n3 are the same.

Here, the valid duration t1 and/or the maximum quantity of access request times n1 are configured for cell2; the valid duration t2 and/or the maximum quantity of access request times n2 are configured for cell3; the valid duration t3 and/or the maximum quantity of access request times n3 are configured for cell4.

Here, the RRC message may contain the measurement configuration of event 2.

Step 334: The UE receives the RRC message containing the conditional handover command of the pre-configured target handover cell, and starts timers T1, T2, T3, and/or counters N1, N2, N3. The duration of timer T1 is t1, the duration of timer T2 is t2, the duration of timer T3 is t3, the maximum quantity of counter N1 is n1, the maximum quantity of counter N2 is n2, and the maximum quantity of counter N3 is n3.

Step 335: The UE performs measurement, where the measurement of cell2 meets event 2, the UE is triggered to initiate a handover. The UE synchronizes and initiates a random access procedure to cell2, but the UE failed to access cell2.

If a timer or a counter is configured for each pre-configured target handover cell, after step 335, it may further include:

Step 336-1: If T1, T2, and T3 have not expired, or the maximum quantity of access request times n1, n2, and n3 has not been reached, the UE may perform the following steps:

The UE can be switched to cell2, cell3, cell4 by sending a handover complete message, or reestablished to cell2, cell3, cell4 by sending an RRC reestablishment request message, or recovered to cell2, cell3, cell4 by sending an RRC resume request message, until T1 expires or the quantity of access times of cell2 reaches the maximum quantity of access request times n1 or the quantity of access times of UE to cell2 and other cells reaches the maximum quantity of access request times n1, then no more attempts to access cell2 again; until T2 expires or the quantity of access times to cell3 reaches the maximum quantity of access request times n2 or the quantity of access times of UE to cell4 and other cells reaches the maximum quantity of access request times n2, then no more attempts to access cell3; until T3 expires or the quantity of access times to cell4 reaches the maximum quantity of access request times n3 or the quantity of access times of UE to cell4 and other cells reaches the maximum quantity of access request times n3, then no more attempts to access cell4; and/or, reestablished to gNB1 and/or reestablished to other cells except cell2, cell3, cell4, gNB1 until T1 or T2 or T3 expires, or until the maximum quantity of access request times n1 or n2 or n3 is reached; among them, every time the UE initiates an access attempt, then corresponding counter is incremented by 1.

Step 337-1: If T1 or T2 or T3 has not expired, or the maximum quantity of access request times n1 or n2 or n3 has not been reached, and the UE is successfully switched, reestablished or recovered; for SCG, the PSCell synchronization reconfiguration is completed successfully, then timer T1, T2 and T3 or the counter N1, N2 and N3 are stopped, and the configuration information of other pre-configured cells are released.

Step 337-1: If T1, T2 and T3 expire, or the maximum quantity of access request times n1, n2 and n3 are reached, the UE may perform at least one of the following steps.

The UE enters the idle state.

The UE triggers RRC re-establishment to other cells except cell2, cell3, cell4, and gNB1.

If it is an SCG PSCell, SCG link failure is reported.

If a timer and a counter are configured for each pre-configured target handover cell, after step 335, it may further include:

Step 336-2: If T1, T2 and T3 have not expired and the maximum quantity of access request times n1, n2 and n3 have not been reached, the UE may perform the following steps:

The UE can be switched to cell2, cell3, cell4 by sending a handover complete message, or reestablished to cell2, cell3, cell4 by sending an RRC reestablishment request message, or recovered to cell2, cell3, cell4 by sending an RRC resume request message, until T1 expires or the quantity of access times of UE to cell2 reaches the maximum quantity of access request time s n1 or the quantity of access times of UE to cell2 and other cells reaches the maximum quantity of access request times n1, then no more attempts to access cell2 and cell3 again; until T2 expires or the quantity of access times to cell3 reaches the maximum quantity of access request times n2 or the quantity of access times of UE to cell3 and other cells reaches the maximum quantity of access request times n2, then no more attempts to access cell3; until T3 expires or the quantity of access times to cell4 reaches the maximum quantity of access request times n3 or the quantity of access times of UE to cell4 and other cells reaches the maximum quantity of access request times n3, then no more attempts to access cell4; and/or, reestablished to gNB1 and/or reestablished to other cells except cell2, cell3, cell4, gNB1 until T1 or T2 or T3 expires, or until the maximum quantity of access request times n1 or n2 or n3 is reached; every time the UE initiates an access attempt, then the corresponding counter is incremented by 1.

Among them, each time the UE initiates an access attempt, the corresponding counter is incremented by 1.

Step 337-2: If T1 or T2 or T3 has not expired, and the maximum quantity of access request times n1 or n2 or n3 has not been reached, and the UE is successfully switched or reestablished or recovered; for SCG, the PSCell synchronization reconfiguration is completed successfully, then timers T1, T2 and T3 and counters N1, N2 and N3 are stopped, and other pre-configured cell configuration information are released.

Step 338-2: If each pre-configured target handover cell meets that the timer corresponding to the cell does not expire but the counter reaches the maximum quantity of request times or the counter does not reach the maximum quantity of request times but the corresponding timer expires, the UE can perform at least one of the following steps:

The UE enters the idle state;

The UE triggers RRC re-establishment to other cells except cell2, cell3, cell4, and gNB1; or If it is an SCG PSCell, SCG link failure is reported.

The foregoing example is directed to a scenario where different timers and/or different counters are configured and started when receiving a configuration message that includes conditional handover of configuration condition of the pre-configured target handover cell.

In addition, it can also be directed to a scenario where different timers and/or different counters are configured and started when the UE performs handover. See example 4 for details.

Example 4: The scenario where the timer is started when the UE performs handover Step 441: the serving base station gNB1 cell1 configures a measurement configuration for the UE, including the measurement configuration of event 1 and/or the measurement of event 2;

Among them, the measurement of event 1 is used for the serving base station to select the pre-configured target handover cell of condition handover, and the measurement of event 2 is used for the UE to trigger the handover.

Step 442: The UE performs measurement according to the network configuration, and a cell measurement that meets event 1 triggers the UE to report a measurement report.

Step 443: The serving base station obtains the measurement report of the UE, and prepares a pre-configured target handover cell of conditional handover for the UE according to the measurement report.

Wherein, the quantity of pre-configured target handover cells is at least one. For example, there are 3 cells, which includes cell2, cell3 and cell4. The serving base station sends the RRC message containing the conditional handover command of the pre-configured target handover cell to the UE. The configuration information of the target handover cell is determined by the target cell, and is transmitted to the UE by the serving cell through the conditional handover command, or sent to the UE through reorganizing by the serving cell into the conditional handover command.

Wherein, the RRC message also includes the valid duration t, or the valid duration of system information broadcast t, where t is determined by the target handover base station or the serving base station, or the valid duration t is specified in the protocol; and/or the RRC message also include the maximum quantity of access request times n, or the maximum quantity of access request times n for system information broadcasting, where n is determined by the target handover base station or the serving base station, or the maximum quantity of access request times n is specified by the protocol.

Here, the RRC message may contain the measurement configuration of event 2.

Step 444: The UE receives an RRC message containing a conditional handover command for pre-configured target handover cells.

Step 445: The UE performs measurement, where the measurement of cell2 meets event 2, the UE is triggered to initiate a handover. The UE starts a timer T, and the timer duration is t. If there is a maximum quantity of access request times n, the counter is started, and the maximum quantity of the counter is n. The UE synchronizes and initiates a random access procedure to cell2, but the UE failed to access cell2.

Step 446: If T has not expired, the counter is started and the counter has not reached n, the UE can perform the following steps:

The UE can be switched to cell2, cell3, cell4 by sending a handover complete message, or reestablished to cell2, cell3, cell4 by sending an RRC reestablishment request message, or recovered to cell2, cell3, cell4 by sending an RRC resume request message until T expires or the counter reaches the maximum quantity of access request times n; and/or reestablished to gNB1 and/or reestablished to other cells except cell2, cell3, cell4, gNB1 until T expires or the counter reaches the maximum quantity of access request times n.

Among them, each time the UE initiates an access attempt, the corresponding counter is incremented by 1.

Step 447: If T has not expired, the counter is started, and the counter has not reached the maximum quantity of access times n, and the UE is successfully switched or reestablished or recovered; for SCG, the PSCell synchronization reconfiguration is completed successfully, then the timers and/or counters are stopped, and the configuration information of other pre-configured cells is released.

Step 448: If T expires or the counter is started and the counter reaches the maximum quantity of access times n, the UE may perform at least one of the following steps:

The UE enters the idle state;

The UE triggers RRC re-establishment to other cells except cell2, cell3, cell4, and gNB1; or If it is an SCG PSCell, SCG link failure is reported.

The following is an example to specifically describe the specific implementation process of selecting a target access cell within the valid time of the cell configuration information and/or the quantity of valid access times in the method of the present disclosure.

First, the current serving cell of the UE is cell 1 of the base station gNB1, and the UE is configured with pre-configured target handover cells cell2, cell3, and cell4 through the first network device, that is, gNB1.

Then, the measurement of cell2 meets event 2 and the handover is triggered. The UE synchronizes and accesses cell2, but the UE fails to switch to cell2.

Next, in step 202 of the method of the present disclosure, when the timer has not expired and/or the maximum quantity of access request times has not reached n, the target access cell can be selected from the pre-configured target handover cells cell2, cell3, and cell4 for access. Wherein, meeting event 2 is used as the first preset criterion, and the following criterion is used as the second preset criterion for the UE to select the target cell again after failing to access the target cell. The second preset criterion may be a cell reselection criterion, according to the priorities of specified cells, sorted by signal quality, or meeting event 2.

Specifically, the pre-configured target handover cells cell2, cell3, cell4 and/or cell1 can be sorted based on priorities, and the sorting can be implemented by combining with signal quality and cell priority. For example, if the sorting result is cell2, cell3, cell4, cell1, the UE accesses in sequence until the access is successful or the timer expires or the maximum quantity of access request times is reached.

Alternatively, after each access fails, the UE performs measurement and selects the target access cell again from the pre-configured target cells cell2, cell3, and cell4 and/or the serving base station gNB1 cell. If a cell meets event 2, an access request is triggered. If multiple cells meet event 2, the target access cell is selected according to the designated priority and/or signal quality until the access is successful or the timer expires or the maximum quantity of access request times is reached.

Alternatively, after each access fails, the UE performs measurement and selects the target access cell again from the pre-configured target cells cell2, cell3, and cell4 and/or the serving base station gNB 1 cell, and a cell with the highest ranking is selected as the target access cell according to the cell reselection criteria, the access request is triggered until the access is successful or the above timer expires or the maximum quantity of access request times is reached.

The UE selects a new target access cell according to preset criteria, for example, the cell with the highest ranking or meeting event 2. If the selected target access cell is not a pre-configured target handover cell or serving base station gNB 1 cell, the UE can perform the following step:

The UE enters the idle state, and then initiates an RRC establishment request or a re-establishment request to the target access cell. If the re-establishment fails, the UE enters the idle state, and if it is an SCG, the UE reports SCG link failure; or initiates an access request in the target access cell, if the access fails, the quantity of access request times is increased by 1, and the measurement is performed again to select a new target access cell; or initiates an access request in the target access cell, if the access fails, the measurement is performed again to select a new target access cell, and the quantity of access requests does not increase by 1.

Among them, the target access cells can be different cells, for example, the access order is cell2, cell4, cell3, and they can be discontinuous cells, for example, the allowed access order is cell2, cell4, cell2, but access order of cell2, cell2, cell4 is not allowed.

Among them, for the access request message, when the target access cell is the pre-configured target handover cell, the UE may send a handover complete message, and when the target access cell is the serving base station gNB1 cell, the UE may send a reestablishment request or RRC resume request message; or when the target access cell is the pre-configured target handover cell, the UE sends a handover completion message for the first access, and for re-access after the first access fails, the UE sends a reestablishment request or RRC resume message; when the target access cell is the serving base station gNB1 cell, the UE sends a re-establishment request or RRC resume message.

For the above example, the terminal determines that the cell access fails, that is, the terminal determines that the handover fails, the reestablishment fails, or the resume fails, at least one of the following methods can be used:

Random access fails within a preset time; the preset time can be configured by network, similar to the current T304/T307 timer, or specified by the protocol. Different from starting the timer when a handover command is received during normal handover, it is started when handover or re-establishment or RRC resume is triggered or when the random access process is triggered for the first time. The terminal can try multiple random access in the cell within a preset time.

The media access control layer notifies the random access failure.

In other words, the result of random access is used to determine whether the access is successful. That is, the random access failure reported by the MAC layer is used to determine the cell access failure.

The cell handover processing method of the embodiment of the present disclosure obtains configuration information of the target handover cell and at least one of the following information: valid time of cell configuration information or the quantity of valid access times; within the valid time of cell configuration information and/or the quantity valid access times, the cell handover is performed according to the configuration information of target handover cell. In this way, after the terminal handover fails, the valid time of the cell configuration information and/or the quantity of valid access times can be used to make multiple access attempts according to the configuration information of the target handover cell, thereby avoiding the terminal entering the idle state directly or triggering the reestablishment process of other cells to reduce the data interruption time delay.

Figure 3:
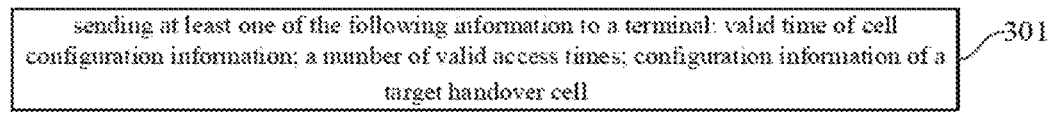
FIG. 3 is a schematic flowchart of a cell handover processing method according to another embodiment of the disclosure.

As shown in FIG. 3, a cell handover processing method is provided for an embodiment of the present disclosure, which is applied to a first network device, and includes the following steps.

Step 301: sending at least one of the following information to a terminal: valid time of cell configuration information; a quantity of valid access times; or configuration information of a target handover cell.

It should be noted that the first network device is the serving base station, that is, the source serving base station during the handover and after the handover.

Here, in an optional embodiment, before step 301, the method may further include: receiving a measurement report sent by the terminal.

That is, the first network device executes step 301 based on the measurement report sent by the terminal.

In another optional embodiment, before step 301, the method may further include: receiving information sent by the second network device. That is, the information may be determined by the second network device and sent to the terminal through the first network device, or may be determined by the first network device and sent to the terminal through the first network device, or at least one of the above information is determined by the second network device and sent to the terminal through the first network device, and at least one thereof is determined by the first network device and sent to the terminal through the first network device.

Here, the second network device is a pre-configured target handover base station. That is, the information sent to the terminal is determined by the second network device and obtained through the second network device.

Specifically, the information is used to enable the terminal to perform cell handover according to the configuration information of target handover cell within the valid time of the cell configuration information and/or the quantity of valid access times.

Optionally, before step 301, the method further includes: configuring, by the first network device, the valid time of cell configuration information for the terminal, where the valid time of the cell configuration information is the valid duration configured for the target cell set configured by the first network device for the terminal.

Wherein, all target handover cells configured by the first network device for the terminal constitute the target cell set; or, all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

Here, the valid time of the cell configuration information and the configuration information of target handover cell can be sent to the terminal through the same handover configuration message, or sent by the network device to the terminal through different handover configuration messages, which is not specifically limited here.

Based on this, optionally, the method further includes: if the configuration duration of the cell configuration information of the target cell set exceeds a first preset duration, notifying the target handover cells in the target cell set to release the configuration information of the terminal.

It should be noted that the first preset duration is greater than or equal to the valid duration configured by the target cell set configured by the first network device for the terminal.

The following takes an example to specifically illustrate the implementation process of this step.

Step 551: The serving base station gNB1 cell1 configures the measurement configuration for the UE, including the measurement configuration of event 1;

Among them, the measurement of event 1 is used for the serving base station to select the pre-configured target handover cell of condition handover.

Step 552: The serving base station obtains the measurement report of the UE, and prepares a pre-configured target handover cell for conditional handover for the UE according to the measurement report.

Among them, cell2 meets event 1. The serving base station sends a handover request message to cell2 through an interface message.

Step 553: If cell2 accepts the request of cell, it generates handover configuration information for the UE, and sends the handover configuration information to cell1 through the interface message.

The interface message or handover configuration information may include the valid time t of the cell configuration information and/or the quantity of valid access times n.

Step 554: After cell receives the response message of cell2, it generates a conditional handover command message and sends the same to the terminal. The message may include the valid time t of the cell configuration information and/or the quantity of valid access times n.

Among them, t and/or n are determined by cell or cell2. Cell1 starts timer T, and the valid duration of T is t or greater than t.

Step 555-1: The timer T does not expire, and cell1 receives indication information indicating that the UE handover is successful;

For example, if the UE is successfully switched to another pre-configured cell cell3, cell sends an indication message to notify cell2 to release the configuration information of the UE.

Step 555-2: T expires, and cell1 does not receive the indication information indicating that the UE handover is successful, then cell1 sends the indication message to notify cell2 to release the configuration information of the UE.

Optionally, before step 301, the method further includes: configuring, by the first network device, the quantity of valid access times for the terminal, the quantity of valid access times being the maximum quantity of valid access times configured for the target cell set configured by the first network device for the terminal.

Wherein, all target handover cells configured by the first network device for the terminal constitute the target cell set; or, all target handover cells configured by the first network device for the terminal through signaling that carries the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

Here, the quantity of valid access times and the configuration information of target handover cell can be sent to the terminal through the same handover configuration message, or sent by the first network device to the terminal through different handover configuration messages, which is not specifically limited here.

It should be noted that the method of the present disclosure is also applicable to a situation where multiple target PSCell cells are pre-configured for the UE during PSCell handover when multiple connections or dual connections are configured.

The cell handover processing method of the embodiment of the present disclosure sends at least one of the following information to a terminal: valid time of cell configuration information; a quantity of valid access times; or configuration information of a target handover cell. In this way, after the terminal handover fails, the valid time of the cell configuration information and/or the quantity of valid access times can be used to make multiple access attempts according to the configuration information of the target handover cell, thereby avoiding the terminal entering the idle state directly or triggering the reestablishment process of other cells to reduce the data interruption time delay.

Figure 4:
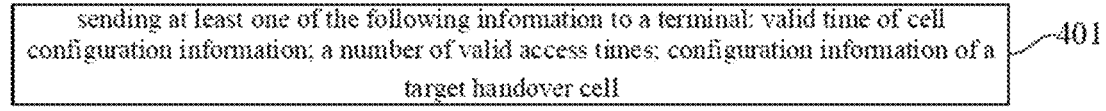
FIG. 4 is a schematic flowchart of a cell handover processing method according to yet another embodiment of the disclosure.

As shown in FIG. 4, a cell handover processing method is provided for an embodiment of the present disclosure, which is applied to a second network device, and includes:

Step 401: sending at least one of the following information to a terminal: valid time of cell configuration information; a quantity of valid access times; or configuration information of a target handover cell.

It should be noted that the second network device is a pre-configured target handover base station. The first network device is the serving base station of the terminal, that is, the source serving base station during the handover and after the handover.

Specifically, the information is used to enable the terminal to perform cell handover according to the configuration information of target handover cell within the valid time of the cell configuration information and/or the quantity of valid access times.

Optionally, before step 401, the method further includes: configuring, by the second network device, a valid time of cell configuration information for the terminal, and the valid time of the cell configuration information is a valid duration configured for a target cell set configured by the second network device for the terminal;

Wherein, all target handover cells configured by the second network device for the terminal constitute the target cell set; or, all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

Specifically, the second network device configures the valid time of the cell configuration information for the terminal, that is, the second network device determines to configure the valid time of the cell configuration information for the terminal and sends the same to the terminal through the first network device.

Here, the valid time of the cell configuration information and the configuration information of target handover cell can be sent to the fnst network device through the same handover configuration message, or sent by the second network device to the first network device through different handover configuration messages, which is not limited herein.

Based on this, optionally, the method further includes: if the configuration duration of the cell configuration information of the target cell set exceeds a second preset duration, notifying the first network device to release the cell configuration information of the target cell set configured for the terminal.

It should be noted that the second preset duration is greater than or equal to the valid duration configured for the target cell set configured by the second network device for the terminal.

The following takes an example to specifically illustrate the implementation process of this step.

Step 661: The serving base station gNB1 cell configures the measurement configuration for the UE, including the measurement configuration of event 1;

Among them, the measurement of event 1 is used for the serving base station to select the pre-configured target handover cell of condition handover.

Step 662: The serving base station obtains the measurement report of the UE, and prepares a pre-configured target handover cell for conditional handover for the UE according to the measurement report.

Among them, cell2 meets event 1. The serving base station sends a handover request message to cell2 through an interface message.

Step 663: If cell2 accepts the request of cell1, it generates handover configuration information for the UE, and sends the handover configuration information to cell1 through the interface message.

The interface message or handover configuration information may include the valid time t of the cell configuration information and/or the quantity of valid access times n. Cell2 starts timer T, and the valid duration of T is t or greater than t.

Step 664: After cell1 receives the response message of cell2, it generates a conditional handover command message and sends the same to the terminal. The message may include the valid time t of the cell configuration information and/or the quantity of valid access times n.

Among them, t and/or n are determined by cell1 or cell2.

Step 665-1: The timer T does not expire, and cell2 receives the handover completion message of the UE and notifies cell1 that the handover is complete.

Step 665-2: The timer T does not expire, the cell2 receives the indication message indicating that the UE releases the context of the cell1, and the cell2 releases the configuration information of the UE.

Step 665-3: T expires, cell2 sends an indication message to notify cell1 that cell2 has released the context of cell1. cell2 releases the configuration information of the UE.

Optionally, before step 401, the method further includes: configuring, by the second network device, the quantity of valid access times for the terminal, the quantity of valid access times being the maximum quantity of valid access times configured for the target cell set configured by the second network device for the terminal;

Wherein, all target handover cells configured by the second network device for the terminal constitute the target cell set; or, all target handover cells configured by the second network device for the terminal through signaling that carries the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

Specifically, the second network device configures the quantity of valid access times for the terminal, that is, the second network device determines to configure the quantity of valid access times for the terminal and sends the same to the terminal through the first network device.

Here, the quantity of valid access times and the configuration information of target handover cell can be sent to the first network device through the same handover configuration message, or sent by the second network device to the first network device through different handover configuration messages, which is not specifically limited here.

The cell handover processing method of the embodiment of the present disclosure sends at least one of the following information to the first network device: valid time of cell configuration information; a quantity of valid access times; or configuration information of a target handover cell. The information are sent to the UE through the first network device, after the terminal handover fails, the valid time of the cell configuration information and/or the quantity of valid access times can be used to make multiple access attempts according to the configuration information of the target handover cell, thereby avoiding the terminal entering the idle state directly or triggering the reestablishment process of other cells to reduce the data interruption time delay.

Figure 5:
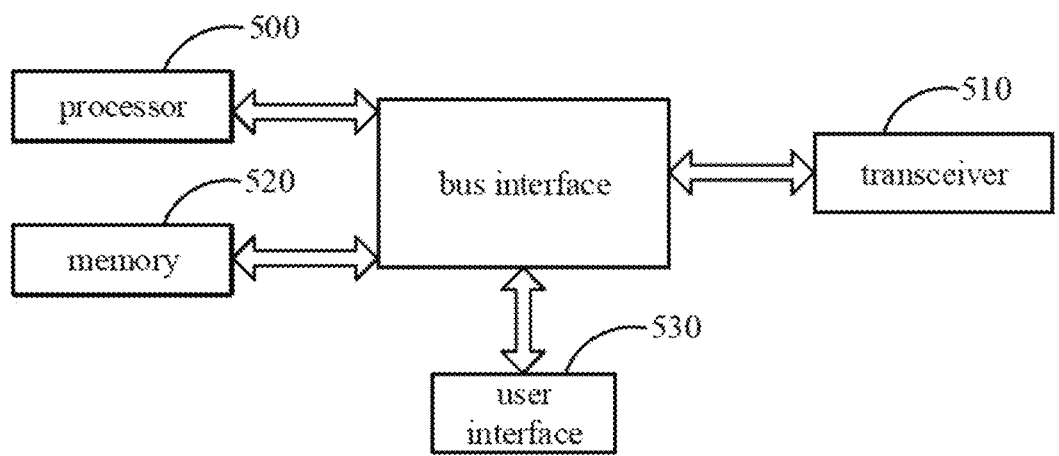
FIG. 5 is a structural block diagram of a terminal according to an embodiment of the disclosure.

As shown in FIG. 5, an embodiment of the present disclosure also provides a terminal, including: a memory 520, a processor 500, a transceiver 510, a bus interface, and a computer program stored on the memory 520 and executed by the processor 500, the processor 500 is configured to read the program in the memory 520 and execute the following: obtaining configuration information of target handover cell and at least one of the following information: valid time of cell configuration information or a quantity of valid access times; and within the valid time of cell configuration information and/or the quantity of valid access times, performing cell handover according to the configuration information of target handover cell.

Wherein, in FIG. 5, the bus architecture may include any quantity of interconnected buses and bridges. Specifically, various circuits of one or more processors represented by the processor 500 and the memory represented by the memory 520 are linked together. The bus architecture can also link various other circuits such as peripheral devices, voltage regulators, power management circuits, etc., which are all known in the art, and therefore, no further description will be given herein. The bus interface provides the interface.

The transceiver 510 may be a plurality of elements, that is, including a transmitter and a transceiver, and provide a unit for communicating with various other devices on a transmission medium. For different user device, the user interface 530 may also be an interface capable of connecting externally and internally with the device. The connected device includes but not limited to a keypad, a display, a speaker, a microphone, a joystick, and the like.

The processor 500 is responsible for managing the bus architecture and general processing, and the memory 520 can store data used by the processor 500 when performing operations.

Optionally, the valid time of cell configuration information is a valid duration configured for a target cell set configured by the network device for the terminal.

Wherein, all target handover cells configured by the network device for the terminal constitute the target cell set; or, all target handover cells configured by the network device for the terminal through signaling that carries the valid time of cell configuration information constitute the target cell set; or each target handover cell configured by the network device for the terminal respectively constitutes one target cell set; or each target handover cell configured by the network device for the terminal through the signaling carrying the valid time of cell configuration information respectively constitutes one target cell set.

Optionally, the quantity of valid access times is the maximum quantity of valid access times configured for the target cell set configured by the network device for the terminal;

Wherein, all target handover cells configured by the network device for the terminal constitute the target cell set; or all target handover cells configured by the network device for the terminal through signaling carrying the quantity of valid access times constitute the target cell set; or each target handover cell configured by the network device for the terminal respectively constitutes one target cell set; or each target handover cell configured by the network device for the terminal through the signaling carrying the quantity of valid access times respectively constitutes one target cell set.

Optionally, the processor 500 may also execute the computer program to implement the following steps: within the valid time of cell configuration information and/or the quantity of valid access times, sending an access request message to a target handover cell selected by the terminal.

The access request message includes at least one of the following: a handover complete message, an RRC reestablishment request message, an RRC resume request message, or a primary cell PSCell synchronization reconfiguration complete message of the secondary cell group SCG.

Optionally, the processor 500 may also execute the computer program to implement the following steps: starting a valid timer of cell configuration information and/or a counter of valid access times for the target cell set at a preset start time.

Wherein, the preset start time includes at least one of the following: a moment when the terminal receives signaling including the valid time of cell configuration information; a moment when the terminal receives signaling including the quantity of valid access times; a moment when the terminal receives the signaling including the configuration information of the target handover cell; or a moment when the terminal initiates an access request in the target cell set for the first time.

Wherein, the duration of the valid timer of cell configuration information is the valid time of cell configuration information, and the maximum quantity of the counter of the valid access times is the quantity of valid access times.

Optionally, the processor 500 may also execute the computer program to implement the following steps: selecting a target handover cell for access within the valid time of cell configuration information and/or the quantity of valid access times.

Optionally, the processor 500 may also execute the computer program to implement the following steps: selecting a non-continuous and same target handover cell for access; and/or selecting different target handover cells for access; and/or sorting cells or target handover cells configured by the network according to a preset criteria, and sequentially selecting a target handover cell that meets a preset access threshold for access; and/or sorting the cells or target handover cells configured by the network according to a first preset criterion, selecting a cell with the highest ranking and meeting the preset access threshold as the target handover cell for access, and if the cell access fails, sorting the cells or target handover cells configured by the network according to a second preset criterion, selecting a cell with the highest ranking and meeting the preset access threshold as the target handover cell for access.

Optionally, the processor 500 may also execute the computer program to implement the following steps: stopping the valid time timer of cell configuration information stops when at least one following conditions is met, and/or the counter of valid access times when at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the PSCell synchronization reconfiguration complete message to a cell in the target cell set.

The terminal selects a non-preconfigured cell for access, where the non-preconfigured cell is a cell other than the following cells: the target handover cell configured by the network device for the terminal and/or the current serving cell and/or the current serving base station cell, and the valid time of the cell configuration information of the target handover cell has not expired and/or the quantity of valid access times of the target cell has not been reached.

Optionally, the processor 500 may also execute the computer program to implement the following steps: after the valid time of cell configuration information expires and/or the quantity of valid access times is reached, the method may further include that: the terminal enters an idle state; the terminal triggers RRC re-establishment to a cell other than the following cells: the target handover cell configured by the network device for the terminal and/or the current serving cell and/or the current serving base station cell; the valid time of cell configuration information of other cells accessed by the terminal has not expired and/or the quantity of valid access times has not reached; SCG link failure is reported.

Optionally, the processor 500 may also execute the computer program to implement the following: the method for the terminal to determine the cell access failure includes at least one of the following: a random access fails within a preset time; or the media access control layer notifies the random access failure.

Figure 6:
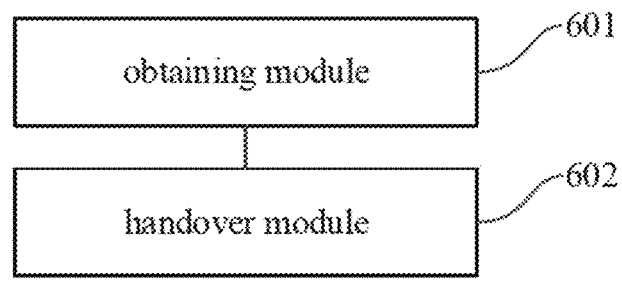
FIG. 6 is a schematic diagram of modules of a terminal according to an embodiment of the disclosure.

As shown in FIG. 6, an embodiment of the present disclosure also provides a terminal, including: an obtaining module 601, configured to obtain configuration information of target handover cell and at least one of the following information: valid time of cell configuration information or a quantity of valid access times; and a handover module 602, configured to, within the valid time of cell configuration information and/or the quantity of valid access times, perform cell handover according to the configuration information of target handover cell.

Optionally, the valid time of cell configuration information is a valid duration configured for a target cell set configured by the network device for the terminal.

Wherein, all target handover cells configured by the network device for the terminal constitute the target cell set; or, all target handover cells configured by the network device for the terminal through signaling that carries the valid time of cell configuration information constitute the target cell set; or each target handover cell configured by the network device for the terminal respectively constitutes one target cell set; or each target handover cell configured by the network device for the terminal through the signaling carrying the valid time of cell configuration information respectively constitutes one target cell set.

Optionally, the quantity of valid access times is the maximum quantity of valid access times configured for the target cell set configured by the network device for the terminal;

Wherein, all target handover cells configured by the network device for the terminal constitute the target cell set; or all target handover cells configured by the network device for the terminal through signaling carrying the quantity of valid access times constitute the target cell set; or each target handover cell configured by the network device for the terminal respectively constitutes one target cell set; or each target handover cell configured by the network device for the terminal through the signaling carrying the quantity of valid access times respectively constitutes one target cell set.

In the terminal of this embodiment, the handover module 602 includes: a sending unit, configured to, within the valid time of cell configuration information and/or the quantity of valid access times, send an access request message to a target handover cell selected by the terminal.

The access request message includes at least one of the following: a handover complete message, an RRC reestablishment request message, an RRC resume request message, or synchronization reconfiguration complete message of a primary cell of the secondary cell group SCG PSCell.

The terminal of this embodiment further includes: a staring module, configured to start a valid timer of cell configuration information and/or a counter of valid access times for the target cell set at a preset start time.

Wherein, the preset start time includes at least one of the following: a moment when the terminal receives signaling including the valid time of cell configuration information; a moment when the terminal receives signaling including the quantity of valid access times; a moment when the terminal receives the signaling including the configuration information of the target handover cell; or a moment when the terminal initiates an access request in the target cell set for the first time.

Wherein, the duration of the valid timer of cell configuration information is the valid time of cell configuration information, and the maximum quantity of the counter of the valid access times is the quantity of valid access times.

In the terminal of this embodiment, the handover module 602 includes: a selection unit, configured to select a target handover cell for access within the valid time of cell configuration information and/or the quantity of valid access times.

In the terminal of this embodiment, the selection unit is specifically configured to: select a non-continuous and same target handover cell for access; and/or selecting different target handover cells for access; and/or sort cells or target handover cells configured by the network according to a preset criteria, and sequentially selecting a target handover cell that meets a preset access threshold for access; and/or sort the cells or target handover cells configured by the network according to a first preset criterion, select a cell with the highest ranking and meeting the preset access threshold as the target handover cell for access, and if the cell access fails, sort the cells or target handover cells configured by the network according to a second preset criterion, select a cell with the highest ranking and meeting the preset access threshold as the target handover cell for access.

The terminal of this embodiment further includes: a stopping module, configured to stop the valid time timer of cell configuration information stops when at least one following conditions is met, and/or the counter of valid access times when at least one following condition is met: randomly accessing to a cell in the target cell set; successfully sending a handover complete message to a cell in the target cell set; receiving an RRC reestablishment message from a cell in the target cell set; receiving an RRC resume message from a cell in the target cell set; or successfully sending the PSCell synchronization reconfiguration complete message to a cell in the target cell set.

The terminal selects a non-preconfigured cell for access, where the non-preconfigured cell is a cell other than the following cells: the target handover cell configured by the network device for the terminal and/or the current serving cell and/Or the current serving base station cell, and the valid time of the cell configuration information of the target handover cell has not expired and/or the quantity of valid access times of the target cell has not been reached.

The terminal of this embodiment further includes: a processing module, specifically configured for at least one of the following: the terminal enters an idle state; or the terminal triggers RRC re-establishment to a cell other than the following cells: the target handover cell configured by the network device for the terminal and/or the current serving cell and/or the current serving base station cell; the valid time of cell configuration information of other cells accessed by the terminal has not expired and/or the quantity of valid access times has not reached; SCG link failure is reported.

The terminal of this embodiment further includes: a determining module, configured to determine the cell access failure when including at least one of the following: a random access fails within a preset time; or the media access control layer notifies the random access failure.

The terminal of the embodiment of the present disclosure obtains the configuration information of the target handover cell and at least one of the following information through the obtaining module: valid time of the cell configuration information or quantity of valid access times; within valid time of cell configuration information and/or the quantity of valid accesses, the handover module performs cell handover according to the configuration information of target handover cell. In this way, after the terminal handover fails, the valid time of the cell configuration information and/or the quantity of valid access times can be used to perform multiple access attempts according to the configuration information of target handover cell, thereby avoiding the terminal from directly entering the idle state or triggering the reestablishment process of other cells, reducing the data interruption time delay.

In some embodiments of the present disclosure, a computer-readable storage medium is also provided, on which a computer program is stored, and when the program is executed by a processor, the following steps are implemented: obtaining configuration information of target handover cell and at least one of the following information: valid time of cell configuration information or a quantity of valid access times; and within the valid time of cell configuration information and/or the quantity of valid access times, performing cell handover according to the configuration information of target handover cell.

When the program is executed by the processor, all the implementation in the above-mentioned method embodiment are applied to the terminal as shown in FIG. 2. To avoid repetition, details are not described herein again.

Figure 7:
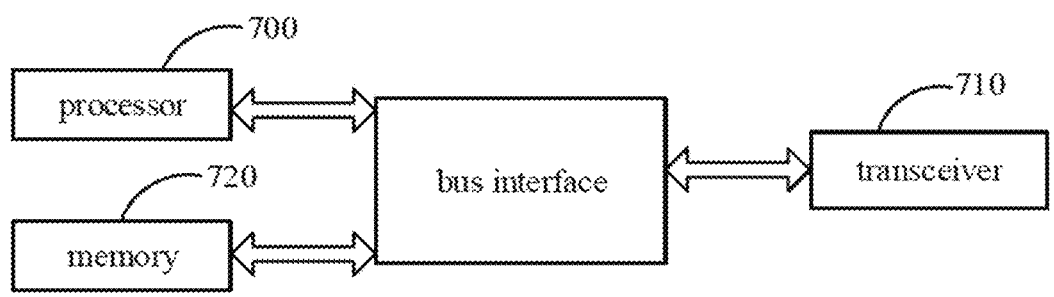
FIG. 7 is a structural block diagram of a first network device according to an embodiment of the disclosure.

As shown in FIG. 7, an embodiment of the present disclosure also provides a first network device, including: a transceiver 710, a memory 720, a processor 700, and a computer program stored in the memory and executed by the processor, the transceiver 710 is configured to: send at least one of the following information to a terminal: valid time of cell configuration information; a quantity of valid access times; or configuration information of a target handover cell.

Wherein, in FIG. 7, the bus architecture may include any quantity of interconnected buses and bridges. Specifically, various circuits of one or more processors represented by the processor 700 and the memory represented by the memory 720 are linked together. The bus architecture can also link various other circuits such as peripheral devices, voltage regulators, power management circuits, etc., which are all known in the art, and therefore, no further description will be given herein. The bus interface provides the interface. The transceiver 710 may be a plurality of elements, including a transmitter and a transceiver, and provide a unit for communicating with various other devices on a transmission medium. The processor 700 is responsible for managing the bus architecture and general processing, and the memory 720 can store data used by the processor 700 when performing operations.

Specifically, the information is used to enable the terminal to perform cell handover according to the configuration information of target handover cell within the valid time of the cell configuration information and/or the quantity of valid access times.

Optionally, the processor 700 executes the computer program to implements the following steps: configuring, by the first network device, the valid time of cell configuration information for the terminal, where the valid time of the cell configuration information is the valid duration configured for the target cell set configured by the first network device for the terminal.

Wherein, all target handover cells configured by the first network device for the terminal constitute the target cell set; or, all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

Optionally, the processor 700 executes the computer program to implement the following steps: if the configuration duration of the cell configuration information of the target cell set exceeds a first preset duration, notifying the target handover cells in the target cell set to release the configuration information of the terminal.

Optionally, the processor 700 executes the computer program to implements the following steps: configuring, by the first network device, the quantity of valid access times for the terminal, the quantity of valid access times being the maximum quantity of valid access times configured for the target cell set configured by the first network device for the terminal.

Wherein, all target handover cells configured by the first network device for the terminal constitute the target cell set; or, all target handover cells configured by the first network device for the terminal through signaling that carries the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

Figure 8:
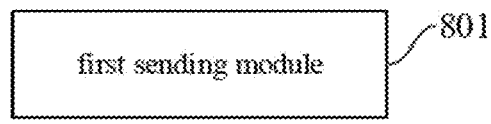
FIG. 8 is a schematic diagram of modules of a first network device according to an embodiment of the disclosure.

As shown in FIG. 8, an embodiment of the present disclosure also provides a first network device, including: a first sending module 801, configured to send at least one of the following information to a terminal: valid time of cell configuration information; a quantity of valid access times; or configuration information of a target handover cell.

Specifically, the information is used to enable the terminal to perform cell handover according to the configuration information of target handover cell within the valid time of the cell configuration information and/or the quantity of valid access times.

The first network device of the embodiment of the present disclosure further includes: a first configuration module, configured to configure the valid time of cell configuration information for the terminal, where the valid time of the cell configuration information is the valid duration configured for the target cell set configured by the first network device for the terminal.

Wherein, all target handover cells configured by the first network device for the terminal constitute the target cell set; or, all target handover cells configured by the first network device for the terminal through signaling that carries the valid time of cell configuration information constitute the target cell set; or each target handover cell or each group of target handover cells configured by the first network device for the terminal respectively constitutes one target cell set; or each target handover cell or each group of target handover cells configured by the first network device for the terminal through the signaling carrying the valid time of cell configuration information respectively constitutes one target cell set.

The first network device of the embodiment of the present disclosure further includes: a first notification module, configured to, if the configuration duration of the cell configuration information of the target cell set exceeds a first preset duration, notify the target handover cells in the target cell set to release the configuration information of the terminal.

The first network device of the embodiment of the present disclosure further includes: a second configuration module, configured to configure the quantity of valid access times for the terminal, the quantity of valid access times being the maximum quantity of valid access times configured for the target cell set configured by the first network device for the terminal.

Wherein, all target handover cells configured by the first network device for the terminal constitute the target cell set;

or, all target handover cells configured by the first network device for the terminal through signaling that carries the quantity of valid access times constitute the target cell set; or each target handover cell or each group of target handover cells configured by the first network device for the terminal respectively constitutes one target cell set; or each target handover cell or each group of target handover cells configured by the first network device for the terminal through the signaling carrying the quantity of valid access times respectively constitutes one target cell set.

The first network device of the embodiment of the present disclosure sends at least one of the following information to the terminal through the first sending module: valid time of cell configuration information; quantity of valid access times; or configuration information of target handover cell; so that after the terminal handover fails, the valid time of the cell configuration information and/or the quantity of valid accesses can be used to make multiple access attempts according to the configuration information of target handover cell, thereby preventing the terminal from directly entering the idle state or triggering the re-establishment process of other cells, reducing data interruption time delay.

In some embodiments of the present disclosure, a computer-readable storage medium is also provided, on which a computer program is stored, and when the program is executed by a processor, the following steps are implemented: sending at least one of the following information to a terminal: valid time of cell configuration information; a quantity of valid access times; or configuration information of a target handover cell.

When the program is executed by the processor, all the implementation in the above-mentioned method embodiment are applied to the network device side as shown in FIG. 3. To avoid repetition, details are not described herein again.

Figure 9:
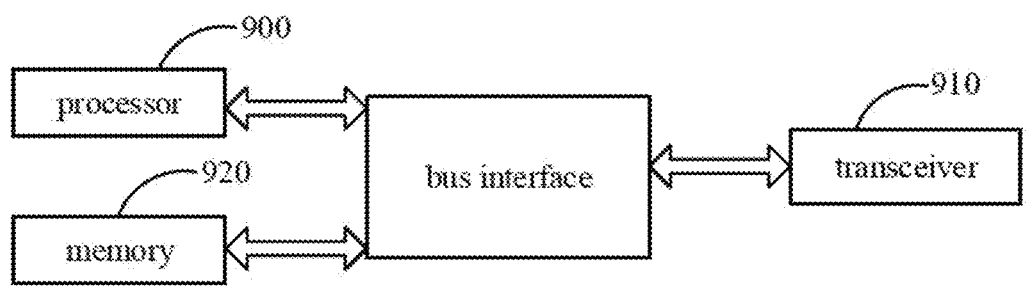
FIG. 9 is a structural block diagram of a second network device according to an embodiment of the disclosure.

As shown in FIG. 9, an embodiment of the present disclosure also provides a second network device, including: a transceiver 910, a memory 920, a processor 900, and a computer program stored in the memory and executed by the processor, the transceiver 910 is configured to: send at least one of the following information to a terminal: valid time of cell configuration information; a quantity of valid access times; or configuration information of a target handover cell.

Wherein, in FIG. 9, the bus architecture may include any quantity of interconnected buses and bridges. Specifically, various circuits of one or more processors represented by the processor 900 and the memory represented by the memory 920 are linked together. The bus architecture can also link various other circuits such as peripheral devices, voltage regulators, power management circuits, etc., which are all known in the art, and therefore, no further description will be given herein. The bus interface provides the interface. The transceiver 910 may be a plurality of elements, including a transmitter and a transceiver, and provide a unit for communicating with various other devices on a transmission medium. The processor 900 is responsible for managing the bus architecture and general processing, and the memory 920 can store data used by the processor 900 when performing operations.

Specifically, the information is used to enable the terminal to perform cell handover according to the configuration information of target handover cell within the valid time of the cell configuration information and/or the quantity of valid access times.

Optionally, the processor 900 executes the computer program to implements the following steps: configuring a valid time of cell configuration information for the terminal, and the valid time of the cell configuration information is a valid duration configured for a target cell set configured by the second network device for the terminal.

Wherein, all target handover cells configured by the second network device for the terminal constitute the target cell set; or, all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

Optionally, the processor 900 implements the following steps when executing the computer program: if the configuration duration of the cell configuration information of the target cell set exceeds a second preset duration, notifying the first network device to release the cell configuration information of the target cell set configured for the terminal.

Optionally, the processor 900 implements the following steps when executing the computer program: configuring the quantity of valid access times for the terminal, the quantity of valid access times being the maximum quantity of valid access times configured for the target cell set configured by the second network device for the terminal.

Wherein, all target handover cells configured by the second network device for the terminal constitute the target cell set; or, all target handover cells configured by the second network device for the terminal through signaling that carries the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

Figure 10:
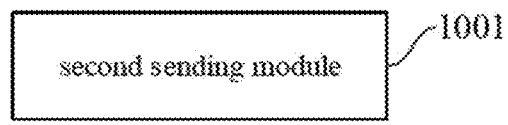
FIG. 10 is a schematic diagram of modules of a second network device according to an embodiment of the disclosure.

As shown in FIG. 10, an embodiment of the present disclosure also provides a second network device, including: a second sending module 1001, configured to send at least one of the following information to a terminal: valid time of cell configuration information; a quantity of valid access times; or configuration information of a target handover cell.

Specifically, the information is used to enable the terminal to perform cell handover according to the configuration information of target handover cell within the valid time of the cell configuration information and/or the quantity of valid access times.

The second network device of the embodiment of the present disclosure further includes: a third configuration module, configured to configure a valid time of cell configuration information for the terminal, and the valid time of the cell configuration information is a valid duration configured for a target cell set configured by the second network device for the terminal.

Wherein, all target handover cells configured by the second network device for the terminal constitute the target cell set; or, all target handover cells configured by the second network device for the terminal through signaling that carries the valid time of cell configuration information constitute the target cell set; or each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

The second network device of the embodiment of the present disclosure further includes: a second notification module, configured to, if the configuration duration of the cell configuration information of the target cell set exceeds a second preset duration, notify the first network device to release the cell configuration information of the target cell set configured for the terminal.

The second network device of the embodiment of the present disclosure further includes: a fourth configuration module, configured to configure the quantity of valid access times for the terminal, the quantity of valid access times being the maximum quantity of valid access times configured for the target cell set configured by the second network device for the terminal.

Wherein, all target handover cells configured by the second network device for the terminal constitute the target cell set; or, all target handover cells configured by the second network device for the terminal through signaling that carries the quantity of valid access times constitute the target cell set; or each target handover cell or each group of target handover cells configured by the second network device for the terminal respectively constitutes one target cell set; or each target handover cell or each group of target handover cells configured by the second network device for the terminal through the signaling carrying the quantity of valid access times respectively constitutes one target cell set.

The second network device of the embodiment of the present disclosure sends at least one of the following information to the first network device through the second sending module: valid time of cell configuration information; quantity of valid access times; or configuration information of target handover cell; In this way, after the terminal handover fails, the valid time of the cell configuration information and/or the quantity of valid access times can be used to perform multiple access attempts according to the configuration information of target handover cell, thereby avoiding the terminal from directly entering the idle state or triggering the reestablishment process of other cells, reducing the data interruption time delay.

In some embodiments of the present disclosure, a computer-readable storage medium is also provided, on which a computer program is stored, and when the program is executed by a processor, the following steps are implemented: sending at least one of the following information to a terminal: valid time of cell configuration information; a quantity of valid access times; or configuration information of a target handover cell.

When the program is executed by the processor, all the implementation manners in the above-mentioned method embodiment are applied to the network device side as shown in FIG. 4. To avoid repetition, details are not described herein again.

In the present disclosure, at least of A, B or C means only A, only B, only C or any combination thereof.

Computer-readable medium include transitory and non-transitory, removable and non-removable medium, and information storage can be realized by any method or technology. The information can be computer-readable instructions, data structures, program modules, or other data. Examples of computer storage medium include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM, digital versatile disc (DVD) or other optical storage, magnetic cassettes, magnetic tape storage or other magnetic storage devices or any other non-transmission medium can be used to store information that can be accessed by computing devices. According to the definition in this disclosure, computer-readable medium does not include transitory medium, such as modulated data signals and carrier waves.

It should be further noted that the terminals described in this disclosure include but are not limited to smart phones, tablet computers, etc., and many of the described functional components are called modules, so as to more particularly emphasize the independence of their implementation methods.

In the embodiments of the present disclosure, the modules may be implemented by software so as to be executed by various types of processors. For example, an identified executable code module may include one or more physical or logical blocks of computer instructions, for example, it may be constructed as an object, process, or function. Nevertheless, the executable code of the identified module does not need to be physically located together, but can include different instructions stored in different locations. When these instructions are logically combined together, they constitute a module and implement the requirements of the module.

In fact, the executable code module can be a single instruction or many instructions, and can even be distributed on multiple different code segments, distributed in different programs, and distributed across multiple memory devices. Likewise, operating data can be identified within the module, and can be implemented in any suitable form and organised in any suitable type of data structure. The operating data may be collected as a single data set, or may be distributed in different locations (including different storage devices), and at least partly may only exist as an electronic signal on a system or a network.

When the module can be implemented by software, taking into account the level of hardware technology in the related art, the module can be implemented by software, regardless of the cost, those skilled in the art can build the corresponding hardware circuit to achieve the corresponding function, the hardware circuit includes a very large-scale integration (VLSI) circuit or gate array in related art, and semiconductors or other discrete components in related art such as logic chips and transistors. Modules can also be implemented with programmable hardware devices, such as field programmable gate arrays, programmable array logic, programmable logic devices, etc.

It can be understood that the embodiments described in the embodiments of the present disclosure can be implemented by hardware, software, firmware, middleware, microcode, or a combination thereof. For hardware implementation, units, modules, sub-units and sub-modules can be implemented in one or more application specific integrated circuits (ASIC), digital signal processing (DSP), digital signal processing device (DSPD), Programmable Logic Device (PLD), Field-Programmable Gate Array (FPGA), general-purpose processors, controllers, microcontrollers, microprocessors, other electronic units used to execute the functions described in this disclosures or combinations thereof.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above exemplary embodiments are described with reference to these drawings. Many different forms and embodiments are possible without departing from the spirit and teachings of the present disclosure. Therefore, the present disclosure should not be constructed as the exemplary embodiments presented herein. More precisely, these exemplary embodiments are provided so that the present disclosure will be complete, and will convey the scope of the present disclosure to those skilled in the art. In these drawings, component sizes and relative sizes may be exaggerated for clarity. The terms used herein are only for the purpose of describing specific exemplary embodiments, and are not intended for limitation. As used herein, unless clearly indicated, the singular forms "a", "an", and "the" are intended to include plural forms as well. It will be further understood that these terms "comprising" and/or "including" when used in this disclosure indicate the existence of the described features, integers, steps, operations, components and/or members, but do not exclude the existence or addition of one or more features, integers, steps, operations, components, components, and/or groups thereof. Unless indicated, a range of values includes the upper and lower limits of the range and any sub-ranges therebetween.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A cell handover processing method, applied to a terminal, comprising:
   obtaining configuration information of a target handover cell and at least one of the following information: valid time of cell configuration information or a quantity of valid access times;
   performing cell handover according to the configuration information of the target handover cell within the valid time of cell configuration information and/or the quantity of valid access times;
   wherein within the valid time of cell configuration information and/or the quantity of valid access times, performing cell handover according to the configuration information of the target handover cell comprises:
   within the valid time of cell configuration information and/or the quantity of valid access times, sending an access request message to the target handover cell selected by the terminal,
   wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

2. The method according to claim 1, wherein the valid time of cell configuration information is a valid duration configured for a target cell set configured by a network device for the terminal,
   all target handover cells configured by the network device for the terminal constitute the target cell set; or
   all target handover cells configured by the network device for the terminal through signaling that carries the valid time of cell configuration information constitute the target cell set; or
   each target handover cell or each group of target handover cells configured by the network device for the terminal respectively constitutes one target cell set; or
   each target handover cell or each group of target handover cells configured by the network device for the terminal through the signaling carrying the valid time of cell configuration information respectively constitutes one target cell set.

3. The method according to claim 1, wherein the quantity of valid access times is a maximum quantity of valid access times configured for a target cell set configured by the network device for the terminal;
   all target handover cells configured by the network device for the terminal constitute the target cell set; or
   all target handover cells configured by the network device for the terminal through signaling carrying the quantity of valid access times constitute the target cell set; or
   each target handover cell or each group of target handover cells configured by the network device for the terminal respectively constitutes one target cell set; or
   each target handover cell or each group of target handover cells configured by the network device for the terminal through the signaling carrying the quantity of valid access times respectively constitutes one target cell set.

4. The method according to claim 1, further comprising:
   starting a valid timer of cell configuration information and/or a counter of valid access times for the target cell set at a preset start time;
   wherein the preset start time includes at least one of the following:
   a moment when the terminal receives signaling including the valid time of cell configuration information;
   a moment when the terminal receives signaling including the quantity of valid access times;
   a moment when the terminal receives signaling including the configuration information of the target handover cell; or
   a moment when the terminal initiates an access request in the target cell set for a first time,
   wherein a duration of the valid timer of cell configuration information is the valid time of cell configuration information, and a maximum quantity of the counter of the valid access times is the quantity of valid access times.

5. The method according to claim 1, wherein within the valid time of cell configuration information and/or the quantity of valid access times, performing cell handover according to the configuration information of the target handover cell comprises:
   selecting the target handover cell for access within the valid time of cell configuration information and/or the quantity of valid access times,
   wherein the selecting the target handover cell for access comprises:
   selecting a non-continuous and same target handover cell for access; and/or
   selecting different target handover cells for access; and/or
   sorting cells or target handover cells configured by network according to a preset criteria, and sequentially selecting a target handover cell that meets a preset access threshold for access; and/or
   sorting the cells or target handover cells configured by the network according to a first preset criterion, selecting a cell with the highest ranking and meeting the preset access threshold as the target handover cell for access, and if the cell access fails, sorting the cells or target handover cells configured by the network according to a second preset criterion, selecting a cell with the highest ranking and meeting the preset access threshold as the target handover cell for access.

6. The method according to claim 1, further comprising:
stopping the valid timer of cell configuration information when at least one following condition is met, and/or stopping the counter of valid access times when the at least one following condition is met:
randomly accessing to a cell in the target cell set;
successfully sending a handover complete message to a cell in the target cell set;
receiving an RRC reestablishment message from a cell in the target cell set;
receiving an RRC resume message from a cell in the target cell set; or
successfully sending the synchronization reconfiguration complete message of PSCell to a cell in the target cell set;
wherein the terminal selects a non-preconfigured cell for access, the non-preconfigured cell is a cell other than the following cells: the target handover cell configured by the network device for the terminal and/or a current serving cell and/or a current serving base station cell, and the valid time of cell configuration information of the target handover cell has not expired and/or the quantity of valid access times of the target handover cell has not been reached,
wherein the terminal determines the cell access failure when at least one of the following is included:
a random access failure within a preset time; or
the media access control layer notifying the random access failure.

7. The method according to claim 1, wherein after the valid time of cell configuration information expires and/or the quantity of valid access times is reached, the method further comprises:
the terminal entering an idle state;
the terminal triggering RRC re-establishment to a cell other than the following cells: the target handover cell configured by the network device for the terminal and/or a current serving cell and/or a current serving base station cell;
the valid time of cell configuration information of other cells accessed by the terminal having not expired and/or the quantity of valid access times of the target handover cell having not reached;
reporting SCG link failure.

8. A cell handover processing method, applied to a first network device, comprising:
sending at least one of following information to a terminal: valid time of cell configuration information; a quantity of valid access times; or configuration information of a target handover cell;
wherein the valid time of cell configuration information and/or the quantity of valid access times is used for the terminal to send an access request message to the target handover cell selected by the terminal,
wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

9. The method according to claim 8, wherein the information is used to enable the terminal to perform cell handover according to the configuration information of target handover cell within the valid time of the cell configuration information and/or the quantity of valid access times.

10. The method according to claim 8, further comprising:
configuring, by the first network device, the valid time of cell configuration information for the terminal, the valid time of the cell configuration information being a valid duration configured for a target cell set configured by the first network device for the terminal;
wherein, all target handover cells configured by the first network device for the terminal constitute the target cell set; or
all target handover cells configured by the first network device for the terminal through signaling that carries the valid time of cell configuration information constitute the target cell set; or
each target handover cell or each group of target handover cells configured by the first network device for the terminal respectively constitutes one target cell set; or
each target handover cell or each group of target handover cells configured by the first network device for the terminal through the signaling carrying the valid time of cell configuration information respectively constitutes one target cell set.

11. A cell handover processing method, applied to a second network device, comprising:
sending at least one of the following information to a first network device: valid time of cell configuration information; a quantity of valid access times; or configuration information of a target handover cell;
wherein the valid time of cell configuration information and/or the quantity of valid access times is used for a terminal to send an access request message to the target handover cell selected by the terminal,
wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

12. The method according to claim 11, wherein the information is used to enable the terminal to perform cell handover according to the configuration information of target handover cell within the valid time of the cell configuration information and/or the quantity of valid access times.

13. The method according to claim 11, further comprising:
configuring, by the second network device, the valid time of cell configuration information for the terminal, the valid time of the cell configuration information being a valid duration configured for a target cell set configured by the second network device for the terminal;
wherein, all target handover cells configured by the second network device for the terminal constitute the target cell set; or
all target handover cells configured by the second network device for the terminal through signaling that carries the valid time of cell configuration information constitute the target cell set; or
each target handover cell or each group of target handover cells configured by the second network device for the terminal respectively constitutes one target cell set; or each target handover cell or each group of target handover cells configured by the second network device for the terminal through the signaling carrying the valid time of cell configuration information respectively constitutes one target cell set.

14. A terminal comprising: a transceiver, a memory, a processor, and a computer program stored on the memory and executed by the processor; wherein the processor executes the computer program to implement the following steps:
- obtaining configuration information of a target handover cell and at least one of the following information: valid time of cell configuration information or a quantity of valid access times;
- performing cell handover according to the configuration information of the target handover cell within the valid time of cell configuration information and/or the quantity of valid access times;
- wherein the processor further executes the computer program to implement the following step:
- within the valid time of cell configuration information and/or the quantity of valid access times, sending an access request message to the target handover cell selected by the terminal,
- wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

15. The terminal according to claim 14, wherein the quantity of valid access times is a maximum quantity of valid access times configured for a target cell set configured by the network device for the terminal;
- all target handover cells configured by the network device for the terminal constitute the target cell set; or
- all target handover cells configured by the network device for the terminal through signaling carrying the quantity of valid access times constitute the target cell set; or
- each target handover cell or each group of target handover cells configured by the network device for the terminal respectively constitutes one target cell set; or
- each target handover cell or each group of target handover cells configured by the network device for the terminal through the signaling carrying the quantity of valid access times respectively constitutes one target cell set.

16. The terminal according to claim 14, wherein the processor further executes the computer program to implement the following steps:
- after the valid time of cell configuration information expires and/or the quantity of valid access times is reached, the method further comprises:
- the terminal entering an idle state;
- the terminal triggering RRC re-establishment to a cell other than the following cells: the target handover cell configured by the network device for the terminal and/or a current serving cell and/or a current serving base station cell;
- the valid time of cell configuration information of other cells accessed by the terminal having not expired and/or the quantity of valid access times of the target handover cell having not reached;
- reporting SCG link failure.

17. A first network device, comprising: a transceiver, a memory, a processor, and a computer program stored on the memory and executed by the processor; wherein the transceiver is configured to implement the cell handover processing method:
- sending at least one of following information to a terminal: valid time of cell configuration information; a quantity of valid access times; or configuration information of a target handover cell;
- wherein the valid time of cell configuration information and/or the quantity of valid access times is used for the terminal to send an access request message to the target handover cell selected by the terminal,
- wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

18. A second network device, comprising: a transceiver, a memory, a processor, and a computer program stored on the memory and executed by the processor; wherein the transceiver is configured to implement the cell handover processing method:
- sending at least one of the following information to a first network device: valid time of cell configuration information; a quantity of valid access times; or configuration information of a target handover cell;
- wherein the valid time of cell configuration information and/or the quantity of valid access times is used for a terminal to send an access request message to the target handover cell selected by the terminal,
- wherein the access request message includes at least one of the following: a handover complete message, a radio resource control (RRC) reestablishment request message, an RRC resume request message, or a synchronization reconfiguration complete message of a primary cell of a secondary cell group (SCG) PSCell.

* * * * *